(12) United States Patent
Parthasarathy et al.

(10) Patent No.: US 10,992,650 B2
(45) Date of Patent: Apr. 27, 2021

(54) MANAGING DECRYPTED ACCESS RIGHTS TO ENCRYPTED CONTENT IN A MESSAGE

(71) Applicant: Microsoft Technology Licensing, LLC, Redmond, WA (US)

(72) Inventors: Krishna Kumar Parthasarathy, Redmond, WA (US); Jitender Bisht, Redmond, WA (US); Bhaswar Banerjee, Issaquah, WA (US); Syed Salah Ahmed, Redmond, WA (US); Vinh Trinh, Redmond, WA (US); Keyan Raahemifar, Redmond, WA (US); Zhi Wang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 204 days.

(21) Appl. No.: 16/138,186

(22) Filed: Sep. 21, 2018

(65) Prior Publication Data
US 2020/0099667 A1    Mar. 26, 2020

(51) Int. Cl.
*H04L 29/06*    (2006.01)
*H04L 9/32*    (2006.01)
(Continued)

(52) U.S. Cl.
CPC ........ *H04L 63/0435* (2013.01); *H04L 9/3213* (2013.01); *H04L 51/22* (2013.01); *H04L 63/108* (2013.01)

(58) Field of Classification Search
CPC ............. H04L 63/0435; H04L 63/0428; H04L 63/108; H04L 9/3213; H04L 51/22;
(Continued)

(56) References Cited

U.S. PATENT DOCUMENTS 7,266,847 B2   9/2007   Pauker et al.
7,864,960 B2   1/2011   Green et al.
(Continued)

OTHER PUBLICATIONS

"How can I prevent a recipient from reading a secure, CRES-encrypted message you have sent?", Retrieved from: https://web.archive.org/web/20150914104857/https:/kb.iu.edu/d/bbun, Sep. 14, 2015, 04 Pages.

(Continued)

*Primary Examiner* — Kevin Bechtel
*Assistant Examiner* — Sangseok Park
(74) *Attorney, Agent, or Firm* — Newport IP, LLC; Jacob P. Rohwer

(57) ABSTRACT

The techniques described herein enable a user that sends an email message that includes encrypted content to define a time period during which a recipient of the encrypted content has decrypted access rights. To effectively define the time period, the user can set a time at which the decrypted access rights for the recipient expire. The time occurs after a time at which the email message is sent to the recipient. Upon expiration of the time period, the decrypted access rights to the encrypted content is revoked for the recipient of the email message, thereby providing a proactive element of security for confidential and/or sensitive information. Further, the techniques enable a user to revoke decrypted access rights to the encrypted content for a recipients at any given time after the email message has already been sent, thereby adding a reactive element of security for confidential and/or sensitive information.

20 Claims, 17 Drawing Sheets

(51) Int. Cl.
H04L 12/58 (2006.01)
G06F 21/62 (2013.01)
(58) Field of Classification Search
CPC ....... H04L 51/18; H04L 51/12; H04L 63/083; H04L 63/205; H04L 51/066; H04L 51/08; H04L 9/3226; H04L 63/123; H04L 63/0236; G06F 21/6218; G06F 21/6209; G06F 2221/2137; G06F 2221/2141; H04W 4/12
See application file for complete search history.

(56) References Cited

U.S. PATENT DOCUMENTS

| | | | |
|---|---|---|---|
| 8,291,031 | B1 | 10/2012 | Kirkham et al. |
| 8,930,474 | B2 | 1/2015 | Sobhani |
| 9,232,016 | B2 | 1/2016 | Caskey et al. |
| 2005/0198170 | A1 | 9/2005 | Lemay et al. |
| 2006/0168074 | A1* | 7/2006 | Gardner .................. H04L 51/12 709/206 |
| 2009/0060189 | A1* | 3/2009 | Osajima ................ H04L 9/0891 380/259 |
| 2009/0097662 | A1* | 4/2009 | Olechowski ............ H04L 63/06 380/286 |
| 2016/0191442 | A1 | 6/2016 | Penilla et al. |
| 2016/0308840 | A1* | 10/2016 | Munshi .................. H04L 63/083 |
| 2018/0054447 | A1* | 2/2018 | Greevy ............... H04L 63/0281 |
| 2018/0176190 | A1 | 6/2018 | Lin et al. |
| 2018/0176256 | A1 | 6/2018 | Lin et al. |

OTHER PUBLICATIONS

"Outlook 2010: Set Up the Expiry Date on Email Messages", Retrieved from: https://www.addictivetips.com/windows-tips/outlook-2010-set-up-the-expiry-date-on-email-messages/, Jan. 12, 2010, 10 Pages.
"Set a message expiration date", Retrieved from: https://support.office.com/en-us/article/set-a-message-expiration-date-fcae213f-8d38-4318-a17b-42d83ac209ed, Retrieved Date: Jul. 10, 2018, 03 Pages.
Dillet, Romain, "Google is testing self-destructing emails in new Gmail", Retrieved from: https://techcrunch.com/2018/04/13/google-is-testing-self-destructing-emails-in-new-gmail/, Apr. 13, 2018, 09 Pages.
Kraus, Rachel, "Here's how the new Gmail's 'expiring emails' feature works", Retrieved from: https://mashable.com/2018/04/27/new-gmail-expiring-emails-confidential-mode/#0cNEetDuuZqf, Apr. 27, 2018, 30 Pages.
"International Search Report and Written Opinion Issued in PCT Application No. PCT/US2019/039107", dated Nov. 11, 2019, 21 Pages. (MS# 404911-WO-PCT).
"Criptext", Retrieved from: https://www.criptext.com/, Retrieved Date: May 11, 2020, 06 Pages.
"Email Encryption Built for Privacy and Compliance", Retrieved from: https://envoy.protectedtrust.com/, 2018, 08 Pages.
"Email Security", Retrieved from: https://web.archive.org/web/20190901205047/https:/www.galaxkey.com/features/email-security/, Sep. 1, 2019, 08 Pages.
"How to Delete/Recall a Sent Email Before Recipients Reading in Outlook?", Retrieved from: https://www.extendoffice.com/documents/outlook/4035-outlook-delete-recall-sent-email.html, Retrieved Date: Nov. 2, 2019, 05 Pages.

"How to Encrypt an Email", Retrieved from: https://support.citrix.com/article/CTX208306, Aug. 22, 2017, 11 Pages.
"Opentext Secure Mail", Retrieved from: https://www.opentext.com/file_source/OpenText/en_US/PDF/OpenText-IX-Information-Exchange-Secure-Mail-Brochure-EN.pdf, Jun. 2015, 09 Pages.
"OpenText-Secure-Mail-for-Microsoft Office 365", Retrieved from: https://www.opentext.com/file_source/OpenText/en_US/PDF/OpenText-Secure-Mail-for-Office-365-Solution-Overview.pdf, May 2015, 02 Pages.
"Recall or Replace an Email Message that You Sent", Retrieved from: https://web.archive.org/web/20190908171320/https:/supportoffice.com/en-us/article/Recall-or-replace-an-email-message-that-you-sent-35027F88-D655-4554-B4F8-6C0729A723A0, Sep. 8, 2019, 06 Pages.
"Revoke Virtru Encrypted Content", Retrieved from: https://support.virtru.com/hc/en-us/articles/360005927193-Revoking-emails-with-Virtru, Mar. 31, 2020, 12 Pages.
"Send & Open Confidential Emails", Retrieved from: https://web.archive.org/web/20190119190214/https:/support.google.com/mail/answer/7674059?co=GENIE.Platform%3DDesktop&hl=en, Jan. 19, 2019, 03 Pages.
"SenditCertitied", Retrieved from: https://web.archive.org/web/20190530013331/http:/www.senditcertified.com/how-it-works/, May 30, 2019, 03 Pages.
"Virtru", Retrieved from: https://web.archive.org/web/20190429133315/https:/www.virtru.com/our-technology/, Apr. 29, 2019, 08 Pages.
"Application as Filed in U.S. Appl. No. 16/380,891", filed Apr. 10, 2019, 40 Pages (MS# 405864- US-NP).
Anon, Dennis, "The Definitive Guide to Email Encryption", Retrieved from: https://privacy.net/email-encryption/, May 22, 2019, 35 Pages.
Baskaran, et al., "Revoke Email Encrypted by Advanced Message Encryption", Retrieved from: https://docs.microsoft.com/en-us/microsoft-365/compliance/revoke-ome-encrypted-mail?view=o365-worldwide, Feb. 28, 2020, 05 Pages.
Bradford, Alina, "How to Recall an Email in Gmail", Retrieved from: https://web.archive.org/web/20191126022021/https://www.digitaltrends.com/computing/how-to-recall-an-email-in-gmail/, Nov. 14, 2019, 16 Pages.
Bulloch, Susan, "Using the Message Recall feature in IBM Lotus Notes and Domino V8", Retrieved from: https://www.ibm.com/developerworks/lotus/library/notes8-recall/index.html, Aug. 7, 2007, 07 Pages.
George, Anita, "How to Recall an Email in Outlook", Retrieved from: https://web.archive.org/web/20191130213417/https://www.digitaltrends.com/computing/how-to-recall-an-email-in-outlook/, Nov. 28, 2019, 19 Pages.
Klimas, Liz, "How to Recall Emails After You've Already Clicked Send", Retrieved from: https://www.theblaze.com/news/2015/06/18/how-to-recall-emails-after-youve-already-clicked-send, Jun. 18, 2015, 06 Pages.
Notenboom, Leo A., "Can I Stop or 'Un-send' an Email I Sent by Mistake?", Retrieved from: https://askleo.com/can_i_stop_or_unsend_an_email_i_sent_by_mistake/, Mar. 25, 2019, 29 Pages.
Perez, Sarah, "Dmail Makes Your Gmail Messages Self-Destruct", Retrieved from: https://techcrunch.com/2015/07/23/dmail-makes-your-gmail-messages-self-destruct/, Jul. 24, 2015, 17 Pages.
Phillips, Joshua, "How to Cancel Email From Being Sent in MS Outlook", Retrieved from: https://web.archive.org/web/20180706075128/http:/smallbusiness.chron.com/cancel-email-being-sent-ms-outlook-44920.html, Jul. 6, 2018, 03 Pages.
Wiggers, Kyle, "Sent an Email to the Wrong Person? Unsend.it Lets You Remove it from their Inbox", Retrieved from: https://www.digitaltrends.com/computing/unsend-it-email-app/, Apr. 7, 2015, 15 Pages.

* cited by examiner

MANAGING DECRYPTED ACCESS RIGHTS TO ENCRYPTED CONTENT IN A MESSAGE

BACKGROUND

Currently, there are a variety of different cryptographic electronic mail (email) services available to enable a sender to transmit an email message, that includes encrypted content, to a recipient. These cryptographic email services provide the recipient with an ability to decrypt the content. However, many of these cryptographic email services have drawbacks when being used. For example, when an email message with encrypted content is sent from a sender inbox to a recipient inbox, the email message remains in the recipient inbox indefinitely (e.g., until the recipient user deletes the email message). This provides an element of risk with regard to cryptographic email services because the recipient inbox may become compromised after an email message that includes encrypted content is received by the recipient inbox. Consequently, confidential and/or sensitive information (e.g., the content that has been encrypted) may be accessed and/or stolen by a bad actor (e.g., a cyber attacker).

It is with respect to these considerations and others that the disclosure made herein is presented.

SUMMARY

Technologies are described herein for providing cryptographic email service(s) that mitigate drawbacks associated with conventional cryptographic email services by, for example, enabling a user that generates and sends an email message that includes encrypted content to define a time period during which a recipient of the encrypted content has decrypted access rights. To effectively define the time period, the user can set a time at which the decrypted access rights for the recipient expire. As used herein, a "time" used for expiration of decrypted access rights can include a date and a time (e.g., Aug. 24, 2018 at 5:00 PM EDT). The time occurs after a time at which the email message that includes the encrypted content is sent to the recipient. Upon expiration of the time period, the decrypted access rights to the encrypted content are revoked for the recipient of the email message, thereby providing a proactive element of protection and security for confidential and/or sensitive information (e.g., the content encrypted) included in the email message.

The use of a time period to revoke decrypted access rights to encrypted content included in an email message is proactive in the sense that a user can pre-define, at a time in which the email message is being generated and/or sent, that the decrypted access rights are to automatically expire at a future time. Accordingly, this auto-expiration feature can determine when a recipient of the email message loses decrypted access to the encrypted content included therein, even though the email message itself may not and/or cannot be removed from the mailbox of the recipient by the sender. Consequently, examples disclosed herein reduce the chance of confidential and/or sensitive information being accessed and/or stolen by a bad actor (e.g., a cyber attacker).

A user that generates and sends an initial message, such as an email message, with encrypted content may be referred to herein as a sending user, or alternatively, as an "owner" of the encrypted content. A user that receives the email message with the encrypted content may be referred to herein as a receiving user. One or more receiving users may be addressees on the email message via the use of email addresses (e.g., joe@exampledomain.com, beth@companyXYZ.com, etc.).

According to aspects of the present disclosure, a system is provided for generating, by or within a sender mailbox associated with a sender email address, an email message that designates one or more recipient email addresses. The sender mailbox further receives user input requesting (e.g., instructing) that content included in the email message be encrypted. The user input can further define a time period that, upon expiration, disables decrypted access to the content to be encrypted. The content to be encrypted can comprise all or part of the email message. Moreover, the content to be encrypted can include content in a body of the email message, or content that is attached to the email message (e.g., a document, an image, or a video added/inserted as an attachment). The system then encrypts, using a key, the content included in the electronic mail message to produce encrypted content and sends the email message that includes the encrypted content from the sender mailbox to one or more recipient mailboxes associated with the one or more recipient email addresses.

According to further aspects of the present disclosure, a system is provided for receiving, by a recipient mailbox associated with a recipient email address and from the sender mailbox associated with the sender email address, the email message that includes the encrypted content. As described above, decrypted access to the encrypted content can be configured to expire at a specific time in the future (e.g., effectively creating a time period during which a recipient of the encrypted content has decrypted access rights). Subsequently, the recipient mailbox receives a request (e.g., an instruction) to access the encrypted content included in the email message. Based on reception of the request, the system determines whether a time at which the request is received is before the specific time at which decrypted access to the encrypted content is configured to expire. Based on a determination that the time at which the request is received is before the specific time, the system decrypts the encrypted content included in the email message to produce readable content that can be understood by the recipient user (e.g., readable text, a rendered image, etc.). Moreover, the system ultimately causes the readable content to be displayed on a device at which the recipient mailbox is being accessed by the recipient user (e.g., the readable content is transmitted and/or rendered for display). Alternatively, if it is determined that the time at which the request is received is after the specific time, the system prevents the encrypted content from being accessed, decrypted, and displayed to the recipient user.

In various examples, the time period during which decrypted access rights for addressees of the original email message are valid can also be applied to collaboration that occurs after the original email message is sent and/or received. Collaboration can include communications generated and sent based on the original email message. For instance, collaboration can include reply email message(s) generated and sent in response to the original email message. When a recipient replies to the original email message that includes the encrypted content, a message thread or message string is effectively created for the sender user the recipient user, and/or other recipient users of the original email message (e.g., a group of users on an email message thread). The email messages generated and sent in response to the original email message can also be encrypted to protect the confidential and/or sensitive nature of the information being communicated. The encryption of the email messages generated and sent in response to the original email message can be optional (e.g., requested by a responding user) or automatic (e.g., a system requirement based on the initial encryption of the content in the original email message).

To further illustrate, a recipient mailbox can generate a reply to the original email message and the system can determine whether a time at which the reply is to be sent is before the specific time at which decrypted access to the encrypted content in the original email message is configured to expire. Based on a determination that the time at which the reply is to be sent is before the specific time, the system can encrypt content included in the reply to produce encrypted reply content and send the reply that includes the encrypted reply content from the recipient mailbox to the sender mailbox and/or to other recipient mailboxes that were addressed on the original email message. Consequently, the same time for expiration initially set by the sender user of the original email message can be applied to email messages (e.g., replies, forwards, etc.) sent in response to the original email message. Based on a determination that the time at which the reply is to be sent is after the specific time, the system prevents the reply from being sent.

Similar to the discussion above, when a mailbox that receives a reply email message receives a request to access the encrypted reply content included in the reply email message, the system determines whether a time at which the request is received is before the specific time set in association with the encrypted content of the original email message. Based on a determination that the time at which the request is received is before the specific time, the system decrypts the encrypted reply content included in the reply email message to produce readable reply content that can be understood by a recipient user (e.g., readable text, a rendered image, etc.). Alternatively, if it is determined that the time at which the request is received is after the specific time, the system prevents the encrypted reply content from being accessed, decrypted, and displayed to the recipient user.

Additional examples described herein are configured to generate and display notifications associated with the expiration of decrypted access rights. The notifications can be generated and displayed by an email application. Alternatively, the notifications can be system notifications managed, generated, and displayed by a device (e.g., an operating system) that has access to information in the email application (e.g., via the use of an application programming interface "API").

In one example, provided that a recipient user has not yet opened an email message and/or requested access to encrypted content included therein, a notification can remind the recipient user of the impending expiration of decrypted access rights to the encrypted content. Such a notification can specify that decrypted access to the encrypted content is set to expire at a specific time. The notification can be configured for generation and display a predetermined amount of time (e.g., one hour, two hours, five hours, one day, one week, etc.) before the specific time. Moreover, the notification can be configured for generation and display in association with a calendar object (e.g., a calendar appointment) that is automatically generated in a calendar in order to remind the recipient user of the impending expiration of decrypted access rights.

In another example, a notification prompting a sender user to extend the time period for decrypted access can be generated and displayed. This notification may be generated and displayed based on reception of an auto-reply (e.g., an out-of-office message) to the original email message, the auto-reply indicating that a recipient user is unavailable until a time after the time period for decrypted access expires. The sender user may then extend the time period (e.g., enter a new time for expiration of decrypted access rights). The extension may apply to all the recipient users of the original email message. Alternatively, the extension may only apply to the recipient user for which the auto-reply is received.

Additionally or alternatively, the cryptographic email service(s) described herein can enable a user that generates and sends an email message that includes encrypted content to revoke decrypted access rights to the encrypted content for a recipients at any given time after the email message has already been sent, thereby adding a reactive element of protection and security for confidential and/or sensitive information included in the email message. The use of this revocation of decrypted access rights to encrypted content is reactive in the sense that a user can immediately and instantaneously pull the decrypted access rights at any time and for any one of various reasons. Consequently, a recipient of the email message loses decrypted access to the encrypted content included therein, even though the email message itself may not and/or cannot be removed from the mailbox of the recipient by the sender user.

According to further aspects of the present disclosure, a system is provided for generating an email message that designates a recipient email address and for receiving a request (e.g., an instruction) to encrypt content included in the email message and to specify decrypted access rights to a key that is configured to decrypt the encrypted content. The decrypted access rights are for a recipient mailbox associated with the recipient email address. The system then encrypts, based on the request and using the key or a corresponding key, the content included in the email message and sends the email message that includes the encrypted content from a sender mailbox to the recipient mailbox. At a later time, after the email message is sent, a request to revoke the decrypted access rights to the key for the recipient mailbox is received from the sending user that originally sent the email message. Based on the request, the system revokes the decrypted access rights to the key for the recipient mailbox, thereby preventing a recipient user from viewing confidential and/or sensitive information that the sender user no longer wants him or her to see.

It should be appreciated that the above-described subject matter may also be implemented as a computer-controlled apparatus, a computer process (e.g., a method), or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description describes technologies for enabling a user that generates and sends an email message that includes encrypted content to define a time period during which a recipient of the encrypted content has decrypted access rights. To effectively define the time period, the user can set a time at which the decrypted access rights for the recipient expire. The time occurs after a time at which the email message that includes the encrypted content is sent to the recipient. Upon expiration of the time period, the decrypted access rights to the encrypted content is revoked for the recipient of the email message, thereby providing a proactive element of protection and security for confidential and/or sensitive information (e.g., the content encrypted) included in the email message.

Additionally or alternatively, the technologies described herein enable a user that generates and sends an email message that includes encrypted content to revoke decrypted access rights to the encrypted content for a recipients at any given time after the email message has already been sent, thereby adding a reactive element of protection and security for confidential and/or sensitive information included in the email message. The use of this revocation of decrypted access rights to encrypted content is reactive in the sense that a user can immediately and instantaneously pull the decrypted access rights at any time and for any one of various reasons.

Consequently, in association with the following description and examples, a recipient of an email message with encrypted content can lose decrypted access to the encrypted content included therein, even though the email message itself may not and/or cannot be removed from the mailbox of the recipient by the sender user.

Figure 1:
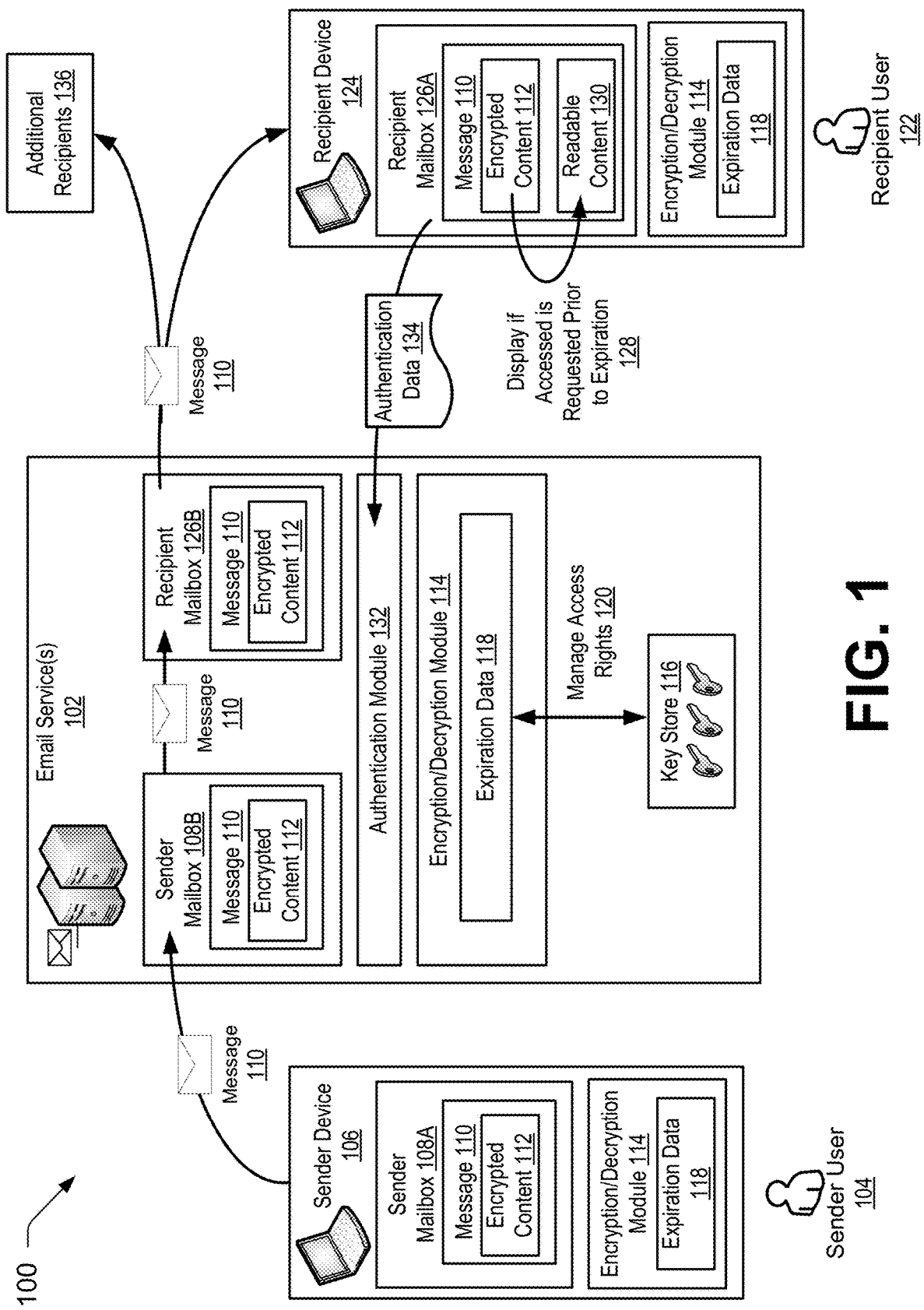
FIG. 1 illustrates an example environment in which a system is configured to manage and/or control decrypted access to encrypted content included in an email message based on expiration data.

Turning to FIG. 1, details will be provided with regard to an example environment 100 in which the techniques described herein can be implemented. FIG. 1 shows aspects of an illustrative system that manages and/or controls decrypted access to encrypted content included in an email message. The encrypted content can comprise all or part of the email message. Moreover, the encrypted content can include content in a body of the email message (e.g., the whole body of the email, part of the body of the email, etc.) and/or content that is attached to the email message (e.g., a document, an image, or a video added/inserted as an attachment). As described above, the illustrative system is configured to manage and/or control decrypted access to the encrypted content based on expiration data. For example, an owner of the encrypted content can pre-set a time in the future at which decrypted access rights expire. This effectively creates a time period during which decrypted access to the encrypted content is enabled and/or allowed for recipients of the email message.

The environment 100 shown in FIG. 1 includes email service(s) 102 capable of receiving, generating, sending, routing, and/or storing email messages. The email service(s) 102 may be comprised of one or more computing devices operated by one or more email service providers (e.g., Google® Gmail®, Microsoft® Outlook®, Yahoo!® Mail, etc.). A sender user 104 may use a sender device 106 to access a sender mailbox 108A and to generate an email message 110 that may include confidential and/or sensitive information to be communicated. Thus, for security purposes, it may be desirable for the sender user 104 to transmit the confidential and/or sensitive information in an encrypted format. Accordingly, in FIG. 1, the confidential and/or sensitive information to be secured and protected is illustrated as encrypted content 112.

The sender mailbox 108A may execute on the sender device 106 via a stand-alone email application installed on the sender device 106 (e.g., a locally installed desktop client for Microsoft® Outlook®, a locally installed mobile client for Gmail®, etc.). Alternatively, the sender mailbox 108A may execute on the sender device 106 via a Web-based email client accessed via a standard Web browser. In both these execution scenarios, the sender mailbox 108A uses a network connection to synchronize with a sender mailbox 108B maintained and operated by an email service 102, and therefore, sender mailboxes 108A and 108B may be collectively referred to herein as sender mailbox 108. It can be appreciated that the sender mailbox 108 may correspond specifically to the sender user 104 and may be accessible based on credentials that uniquely correspond to the sender user 104. For example, the sender mailbox 108 may include data associated with a sender email account including but not limited to inbox data associated with email messages received by the sender email account and outbox data associated with email messages sent from the sender email account. Furthermore, the sender mailbox 108 may be accessible by the sender user 104 upon provision of credentials (e.g., user name, password, biometric data, etc.) associated with the sender mailbox 108.

An encryption/decryption module 114 can be used to encrypt content included in the email message 110 in order to produce the encrypted content 112. In other words, the encryption/decryption module 114 is tasked with encrypting confidential and/or sensitive information identified by the sending user 104. In one example, the content can be encrypted on the sender device 106 and transmitted to the email service 102 in an encrypted format. In another example, the content can be encrypted on a network device (e.g., a server) that is part of an email service 102, and thus, the content is transmitted to the email service 102 in an unencrypted format. Accordingly, FIG. 1 illustrates that an instance of the encryption/decryption module 114 useable to encrypt content can operate on the sender device 106, the email service 102, or both.

In various examples, the encryption/decryption module 114 uses a key to encrypt content. The key useable to decrypt the encrypted content can be stored in a key store 116, and the encryption/decryption module 114 is configured to manage access rights to the stored key maintained in the key store 116. The encryption/decryption module 114 may implement any functionality and/or software suitable for encrypting/decrypting digital content using key(s) (e.g., a symmetry key, public/private keys, etc.). In some embodiments, one or more functionalities of the encryption/decryption module 114 and/or the key store 116 may be performed by a rights management service platform such as, for example, AZURE RIGHTS MANAGEMENT developed by Microsoft®.

In some configurations, the email service(s) 102 comprise at least one application programming interface ("API") that exposes an interface through which devices and/or services described herein communicate data. Through use of this interface and other interfaces, the devices and/or services described herein can communicate and process data in such a manner as to enable the functionality disclosed herein. For example, an API may enable the email service 102 to receive an HTTPS request containing a token from a recipient device and provide decrypted content via a recipient mailbox. In another example, an API may enable one email service 102 to exchange data (e.g., expiration data 118) and/or a key with another email service 102.

As described herein, the sender user 104 can provide input that defines expiration data 118 associated with the encrypted content 112 included in the email message 110. For instance, the expiration data 118 can include a pre-set time in the future (e.g., after the email message is sent), which effectively creates a time period during which decrypted access to the encrypted content 112 is enabled. For instance, the time period runs from a date and/or a time at which the email message 110 is initially sent (e.g., transmitted) to a date and/or a time at which decrypted access to the encrypted content 112 is configured to expire, as specified by the expiration data 118. Consequently, as shown in FIG. 1, the expiration data 118 can be communicated to the email service 102 and the encryption/decryption module 114 uses the expiration data 118 to manage access rights 120, for a recipient user 122 addressed on the email message 110, to a key in the key store 116 that is configured to decrypt the encrypted content 112.

To further illustrate, FIG. 1 shows the recipient user 122 using a recipient device 124 to access the email message 110 that includes the encrypted content 112 via a recipient mailbox 126A. Similar to the sender mailbox 108A, the recipient mailbox 126A may execute on the recipient device 124 via a stand-alone email application, or alternatively, the recipient mailbox 126A may execute on the recipient device 124 via a Web-based email client accessed via a standard Web browser. In both these execution scenarios, the recipient mailbox 126A uses a network connection to synchronize with recipient mailbox 126B maintained and operated by an email service 102, and therefore, recipient mailboxes 126A and 126B may be collectively referred to herein as recipient mailbox 126. It can be appreciated that the recipient mailbox 126 may correspond specifically to the recipient user 122 and may be accessible based on credentials that uniquely correspond to the recipient user 122. For example, the recipient mailbox 122 may include data associated with a recipient email account including but not limited to inbox data associated with email messages received by the recipient email account and outbox data associated with email messages sent from the recipient email account. Furthermore, the recipient mailbox 126 may be accessible by the recipient user 122 upon provision of credentials associated with the recipient mailbox 126. The email service 102 that maintains and operates the recipient mailbox 126 may be the same or different as the email service 102 that operates the sender mailbox 108.

When the recipient user 122 provides input via the recipient device 124 to open the email message 110 via the recipient mailbox 126 and/or to request decrypted access to the encrypted content 112, the encryption/decryption module 114 of the email service 102 is configured to compare a time at which decrypted access to the encrypted content 112 is requested to the time at which the decrypted access rights to the encrypted content are configured to expire, as pre-set by the sender user 104. If decrypted access is requested prior to the time at which expiration 128 is to occur, the encryption/decryption module 114 of the email service 102 is configured to retrieve a key, from the key store 116, and decrypt the encrypted content 112 to produce readable content 130 (e.g., readable text, a rendered image, etc.) that can be transmitted to the recipient device 124 and displayed in association with the email message 110. Consequently, in this scenario, a copy of the email message 110 and/or the encrypted content 112 maintained by the email service 102 (e.g., in the sender mailbox 108B, in the recipient mailbox 126B, or in another mailbox configured to manage email messages with encrypted content) is used to provide the decrypted access to the encrypted content 112, and the key is not distributed to the recipient device 124.

If decrypted access is requested after the time at which expiration occurs, the encryption/decryption module 114 of the email service 102 is configured to prevent access to the key useable to decrypt the encrypted content 112. Consequently, the recipient user 122 is unable to access and view the confidential and sensitive information encrypted and sent by the sender user 104.

In various examples, the recipient device 124 may also include an instance of the encryption/decryption module 114 and/or may receive the expiration data 118 from the email service 102. Consequently, it can be determined at the recipient device 124 whether decrypted access is requested prior to the time at which expiration occurs. Moreover, in this scenario where the recipient device 124 includes an instance of the encryption/decryption module 114, the email service 102 can provide a key to the recipient device 124, provided the decrypted access is requested prior to the time at which expiration is to occur. In this way, a copy of the email message 110 and/or the encrypted content 112 that is transmitted to, and maintained at, the recipient device 124 is used to provide the decrypted access to the encrypted content 112. In some implementations, encryption and decryption at user devices is allowed when an email message is communicated amongst email addresses with a same domain (e.g., an enterprise domain).

In various examples, the email service 102 includes an authentication module 132 that is configured to authenticate the recipient mailbox 126 and/or the recipient user 122 using authentication data 134 prior to providing decrypted access to the encrypted content 112. In one implementation, the email message 110 can include a link configured to enable decrypted access to the encrypted content 112. The link may be displayed within a body of the email message 110, and upon activation, the link enables the recipient device 124 to provide a request with a token, as the authentication data 134, to the authentication module 132 of the email service 102. Upon receipt of the request, the authentication module 132 may determine whether the token that is received from the recipient device 124 is authentic with respect to the recipient mailbox 126 and/or a corresponding recipient email address. In another implementation, the recipient user 122 can enter a passcode, as the authentication data 134, which is to be provided to the authentication module 132 of the email service 102 for authentication purposes.

In the example environment 100 of FIG. 1, the email message 110 can be sent to additional recipients 136 (e.g., additional recipient mailboxes, devices, and users). Thus, the discussion above with respect to the recipient user 122, the recipient device 124, and/or the recipient mailbox 126 can also be applied to the additional recipients 136. For example, the expiration data 118, and more specifically, the time at which decrypted access rights are configured to expire, can apply to more than one recipient of the email message 110. In alternative implementations, the sender user 104 can set a time at which decrypted access rights expire for each individual recipient.

Figure 2:
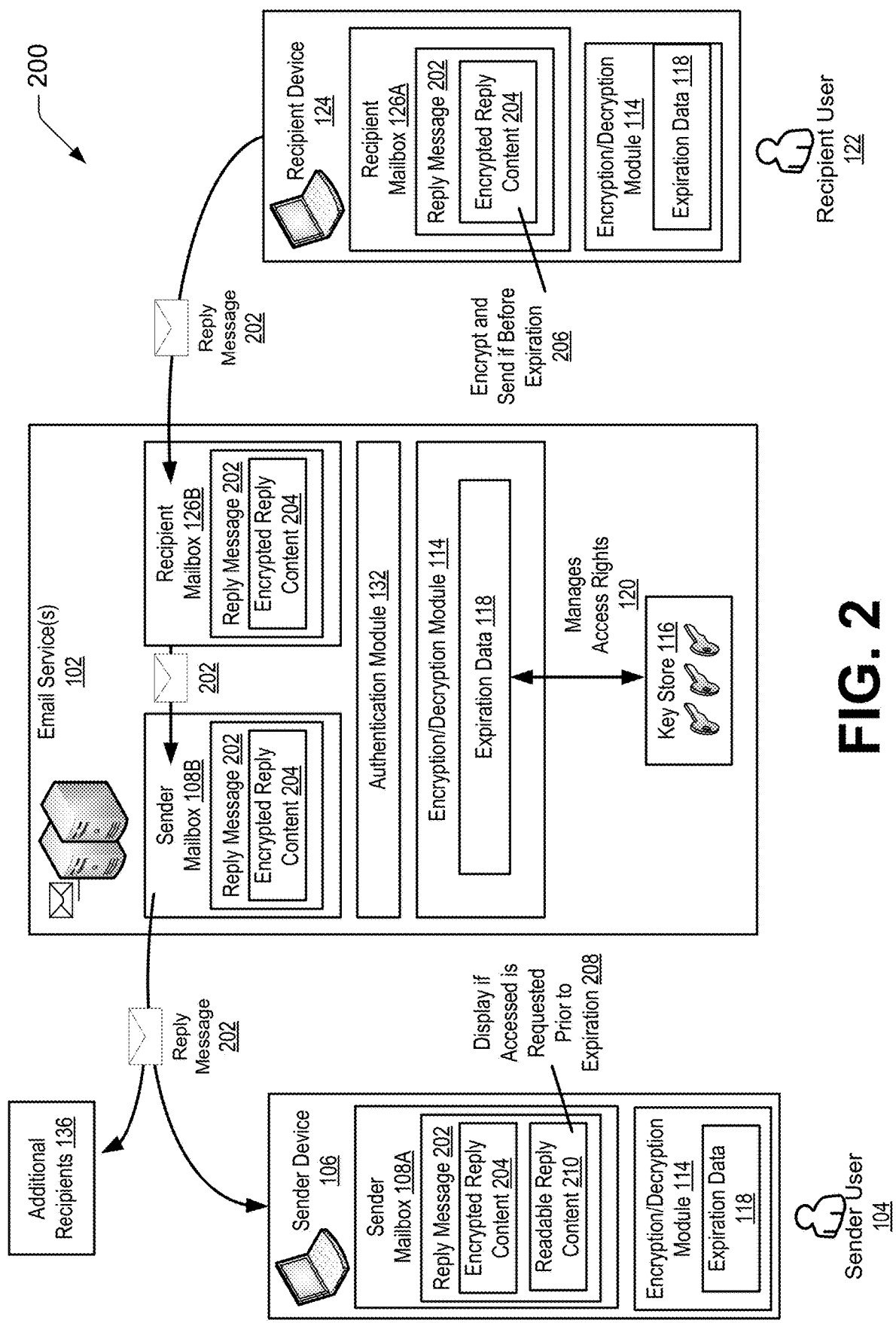
FIG. 2 illustrates an example environment in which a system is configured to manage and/or control decrypted access to encrypted content included in a reply email message based on expiration data.

FIG. 2 illustrates an example environment 200 in which a system is configured to manage and/or control decrypted access to encrypted content included in a reply email message based on expiration data. It can be appreciated that numerous aspects of the example environment 200 are the same or similar to the example environment 100 illustrated with respect FIG. 1. However, in the example environment 200, the recipient user 122 sends a reply email message 202 to the original email message 110 received form the sender user 104 and/or the sender mailbox 108.

As described above, the expiration data 118 useable to effectively create a time period during which decrypted access rights for the original email message 110 are enabled can also be applied to collaboration that occurs after the original email message 110 is sent and/or received. Collaboration can include communications generated and sent based on the original email message 110, which includes the reply email message 202, or alternatively, a forward message to a new or added user. The reply email message 202 can include reply content to be encrypted (e.g., encrypted reply content 204). The encryption of the reply content can be automatically implemented by the system based on the initial encryption of the original email message 110 received by the recipient mailbox 126. For example, a rule or a policy may require that bodies of the email messages in a thread, and/or any attachments to the email messages in the thread, be encrypted. This protects and secures the confidential and sensitive nature of information being communicated and discussed in the thread. That is, a reply to the original email message 110 likely discusses the confidential and sensitive information that is the subject of the original email message 110. Alternatively, the encryption of the reply content can be implemented based on a request (e.g., instruction) from the recipient user 122.

Accordingly, the encryption/decryption module 114 of the email service 102 and/or the recipient device 124 determines whether a time at which the reply email message 202 is to be sent is before the time specified in the expiration data 118. If it is determined that the time at which the reply email message 202 is to be sent is before the expiration time 206 specified in the expiration data 118, the encryption/decryption module 114 encrypts the reply content to produce the encrypted reply content 204 and sends the reply email message 202 with the encrypted reply content 204 to the sender mailbox 108 and/or other recipient mailboxes associated with the additional recipients 136. If it is determined that the time at which the reply email message 202 is to be sent is after the expiration time specified in the expiration data 118, the encryption/decryption module 114 prevents the reply email message 202 from being sent.

When the sender user 104 provides input via the sender device 106 to open the reply email message 202 via the sender mailbox 108 and/or to request decrypted access to the encrypted reply content 204, the encryption/decryption module 114 of the email service 102 and/or the sender device 106 is configured to compare a time at which decrypted access to the encrypted reply content 204 is requested to the time specified in the expiration data 118, as pre-set by the sender user 104. If decrypted access is requested prior to the time at which expiration 208 is to occur, the encryption/decryption module 114 is configured to retrieve a key, from the key store 116, and decrypt the encrypted reply content 204 to produce readable reply content 210 (e.g., readable text, a rendered image, etc.) that can be displayed in association with the reply email message 202. If decrypted access is requested after the time at which expiration is to occur, the encryption/decryption module 114 is configured to prevent access to the key useable to decrypt the encrypted reply content 204. The operations discussed in this paragraph can similarly be implemented for the additional recipients 136. In alternative implementations, decryption may not need to be performed by the sender mailbox 108 for the sender user 104, since the sender user 104 is the "owner" of the original encrypted content 112. However, in these alternative implementations, decryption still needs to be performed for the recipient mailboxes of the additional recipients 136.

In various examples, rules associated with collaboration can be followed by the email service 102. For instance, a rule can govern whether the original email message 110 with the encrypted content 112 can be forwarded to a new or added recipient. The owner of the encrypted content 112 can define the rule, and/or permissions associated with the rule that identify users and/or domains to which the original email message 110 with the encrypted content 112 can be forwarded (e.g., a spouse of a person involved in purchase). Moreover, the email service 102 can generate and send a notification of the forwarding to the owner of the encrypted content 112.

Figure 3:
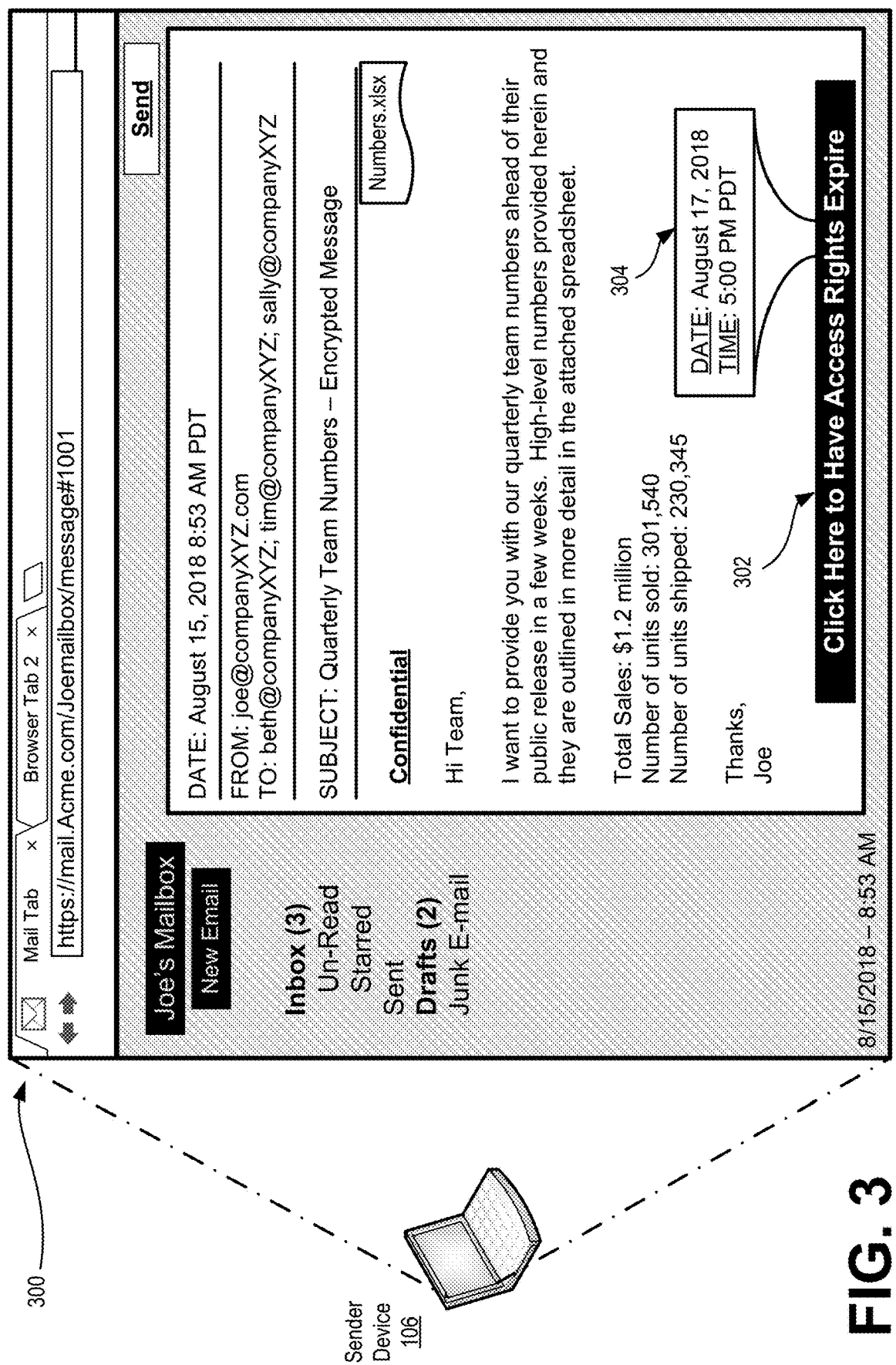
FIG. 3 illustrates aspects of an example graphical user interface (GUI) that can be displayed on a display of the sender device in association with the generation of an email message that includes confidential and/or sensitive information to be encrypted.

Turning now to FIG. 3, aspects of an example graphical user interface (GUI) 300, that can be displayed on a display of the sender device 106 in association with the generation of an email message that includes confidential and/or sensitive information to be encrypted, are illustrated. As shown in the example GUI 300, Joe (e.g., the sender user 104) is using his mailbox to generate and communicate confidential and/or sensitive information (e.g., "Quarterly Team Numbers") to his team members, which include Beth, Tim, and Sally (e.g., each of which are a recipient user 122 addressed in the "To" line). The email message includes a subject line, a body, and an attachment (e.g., a "Numbers" spreadsheet). Joe has provided input to have content of the email message encrypted due to the confidential and/or sensitive nature of the information. Based on this input, the system can be configured to automatically encrypt designated or pre-determined portions of the email message. For example, the system can encrypt all of the body of the email message and any attachments (but not the subject line). Alternatively, the input provided by Joe can specify which portions of the email message Joe wants to have encrypted by the system.

Further based on Joe's input, the system can prompt 302 Joe to set a time when the decrypted access rights for Beth, Tim, and Sally expire. In response to activation of this prompt 302, Joe can enter a time 304 when he would like the decrypted access rights to expire (e.g., Aug. 17, 2018 at 5:00 PM PDT). The email message with the encrypted content is then sent on Aug. 15, 2018 at about 8:53 AM (e.g., the date/time shown at the top of the email message). In various examples, the text of the body of the email message and the text/numbers in the attachment are transformed into ciphertext as a result of the encryption, and thus, are not readable or comprehendible to a viewer in their encrypted format.

As described above, the time 304 when Joe wants the decrypted access rights to expire can be the same for all the recipients of the email message. However, in alternative implementations, the system can enable Joe to set a different time for each individual recipient. That is, he may allow Beth to access and view the encrypted content for five days while only allowing Tim to access and view the encrypted content for three days.

Figure 4:
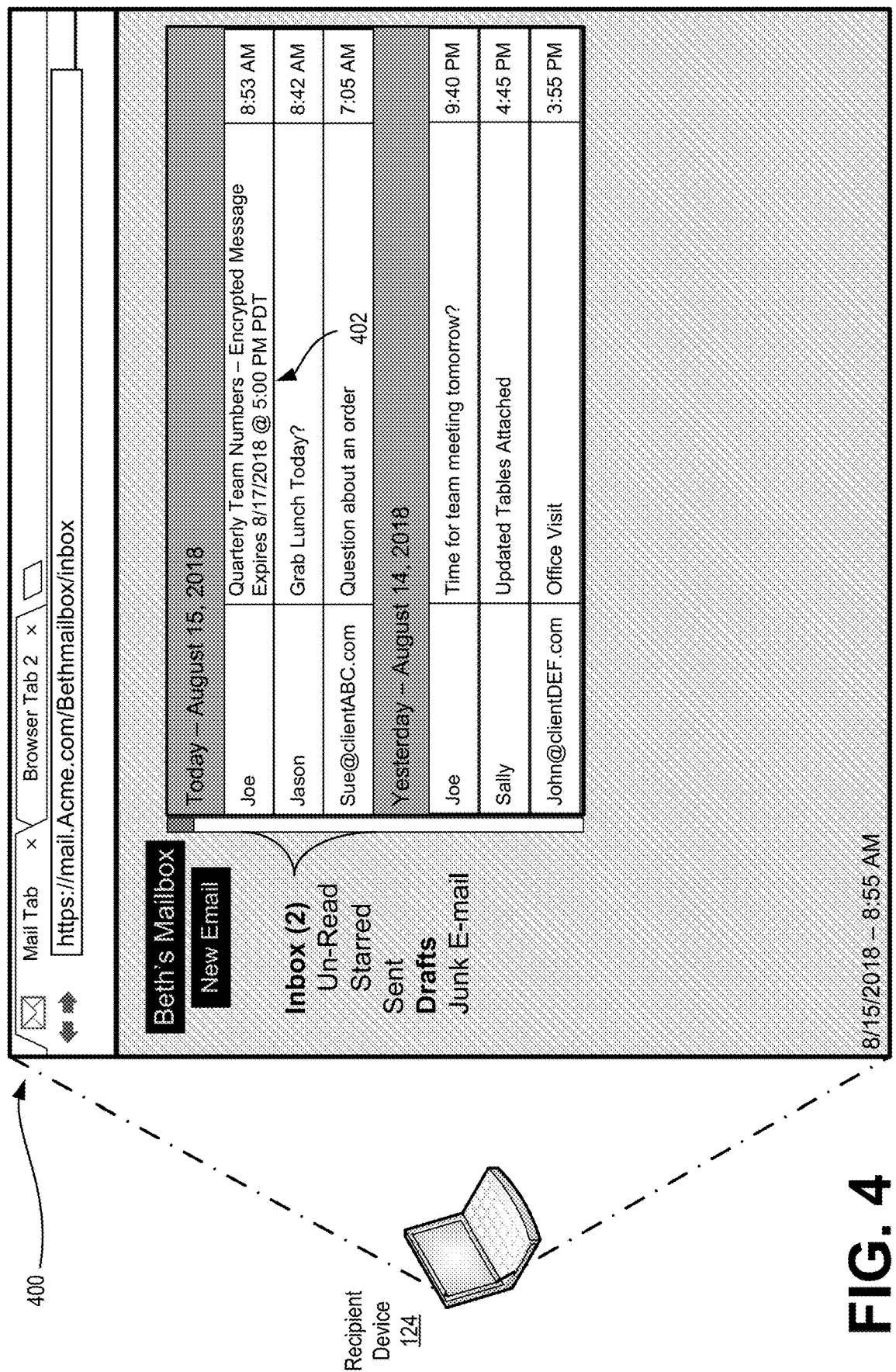
FIG. 4 illustrates aspects of an example GUI that can be displayed on a display of a recipient device in association with the reception of the email message that includes the encrypted content.

Continuing the example set forth in FIG. 3, FIG. 4 illustrates aspects of an example GUI 400 that can be displayed on a display of a recipient device 124 in association with the reception of the email message that includes the encrypted content. As shown, Beth's mailbox receives the email message generated by Joe in FIG. 3, and indexes the email at the top of an inbox. To inform Beth of the confidential and/or sensitive nature of the email message, the subject line indicates that the email message is an encrypted message. Furthermore, the system indicates that decrypted access rights expire by displaying the time 402 set be Joe (e.g., Aug. 17, 2018 at 5:00 PM PDT) in association with the email message.

Figure 5:
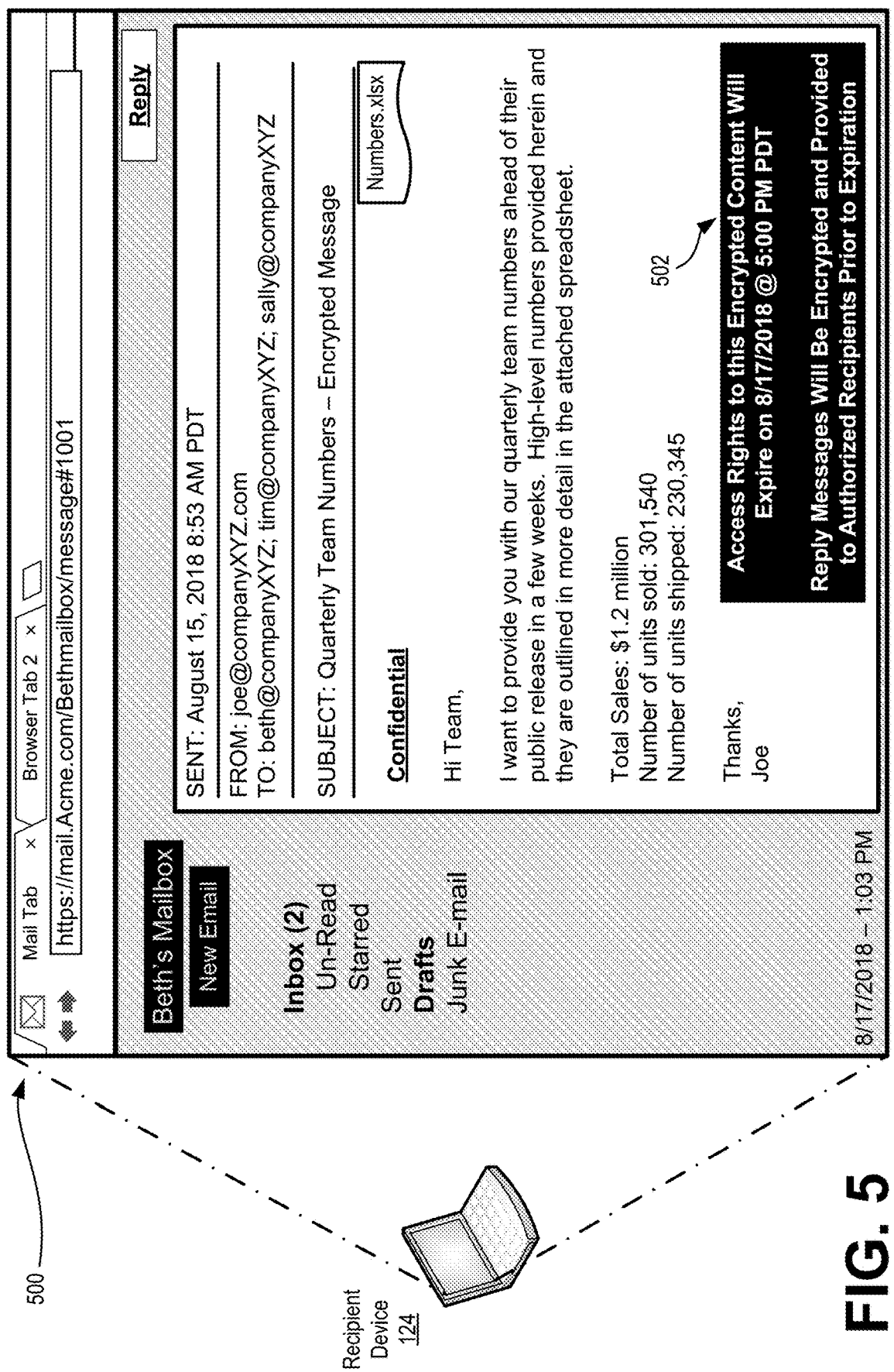
FIG. 5 illustrates aspects of an example GUI that can be displayed on a display of a recipient device after the encrypted content is decrypted prior to expiration of access rights for a recipient.

Turning to FIG. 5 to further continue the example, aspects of another example GUI 500 that can be displayed on the display of the recipient device 124 are illustrated. As shown, the encrypted content of Joe's email message has been decrypted, transmitted, and/or displayed in a readable form so Beth can read the text of the body of the email message and/or open the attachment (e.g., the "Numbers" spreadsheet) to view the readable text/numbers. This occurs because Beth opened the email message and requested decrypted access rights to the encrypted content prior to the time at which the decrypted access rights are set to expire for Beth (as set by Joe in FIG. 3). As shown, Beth opened the email message and requested access to the encrypted content at about Aug. 17, 2018 at 1:03 PM, which is before Aug. 17, 2018 at 5:00 PM.

In various examples, the system can provide a notification 502 to a viewer of the email message, indicating when the access rights to the encrypted content are set to expire and/or informing the viewer that reply email messages will be encrypted and provided to authorized recipients prior to the expiration time, as set by Joe in FIG. 3.

Figure 6A:
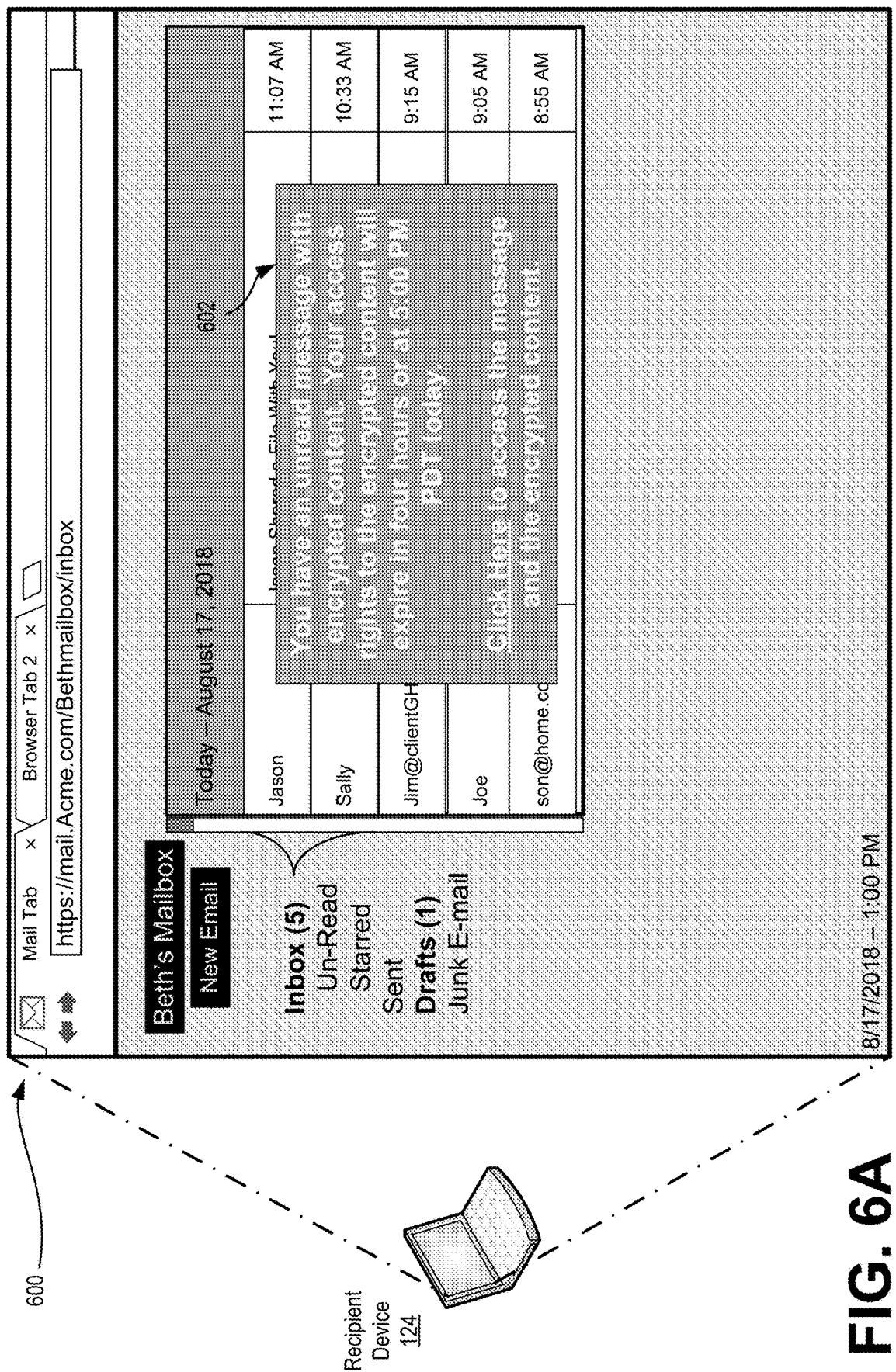
FIG. 6A illustrates an example GUI that can be displayed on the display of the recipient device prior to receiving a request, from a recipient user, to access the encrypted content included in the email message.

FIG. 6A illustrates an example GUI 600 that can be displayed on the display of the recipient device 124 prior to receiving a request, from a recipient user, to access the encrypted content included in the email message (e.g., example GUI 600 can be displayed prior to the example GUI 500 in FIG. 5). The example GUI 600 displays a notification 602 that reminds Beth that the encrypted content is configured to expire at the time set by Joe in FIG. 3. The notification 602 can be generated and displayed if Beth has not yet opened an email message and/or requested access to encrypted content included therein. Moreover, the notification 602 can be configured for generation and display a predetermined amount of time (e.g., one hour, two hours, five hours, one day, one week, etc.) before the expiration time. In the example of FIG. 6A, the notification 602 is generated and displayed on Aug. 17, 2018 at 1:00 PM, or four hours before the decrypted access rights for Beth are set to expire.

The notification 602 can be generated and displayed by an email application. Alternatively, the notification 602 can be a system notification managed, generated, and displayed by a device (e.g., an operating system) that has access to information in the email application (e.g., via the use of an application programming interface "API").

Figure 6B:
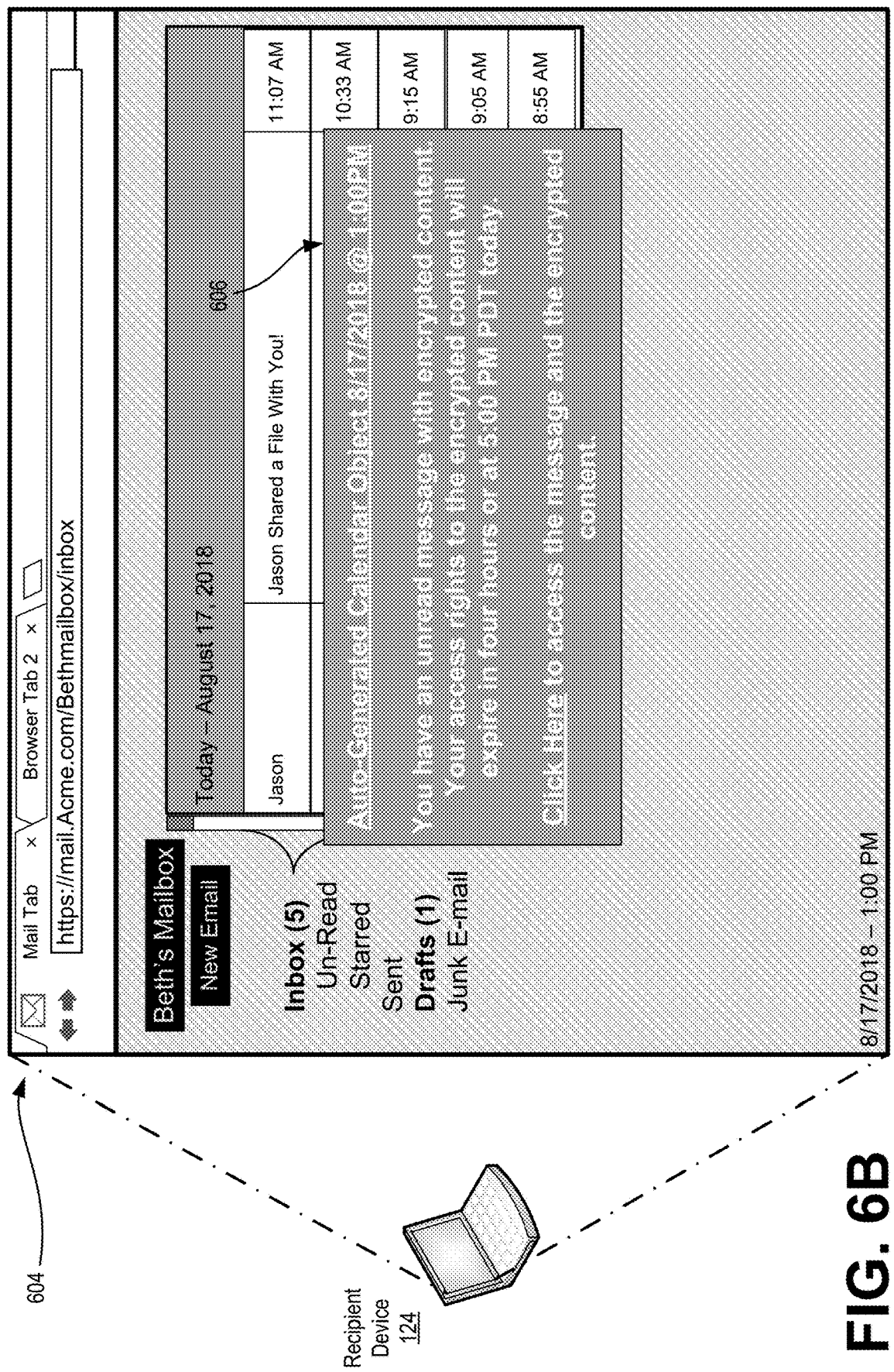
FIG. 6B illustrates another example GUI that can be displayed on the display of the recipient device prior to receiving a request, from a recipient user, to access the encrypted content included in the email message.

FIG. 6B illustrates another example GUI 604 that can be displayed on the display of the recipient device 124 prior to receiving a request, from a recipient user, to access the encrypted content included in the email message (e.g., example GUI 604 can be displayed prior to the example GUI 500 in FIG. 5). The example GUI 604 displays a notification 606 that reminds Beth that the encrypted content is configured to expire at the time set by Joe in FIG. 3. However, in this example, the notification 606 is generated and displayed in association with a calendar object (e.g., calendar appointment) that is automatically generated to remind Beth of the impending expiration of decrypted access rights to encrypted content. Accordingly, the system can automatically reserve time in Beth's schedule to attract her attention to the email message. The reserved time for the calendar object can be a predetermined amount of time before expiration (e.g., four hours). Additionally or alternatively, the reserved time for the calendar object can be an open time slot (e.g., the first available time slot) within a predetermined amount of time before expiration.

Figure 7:
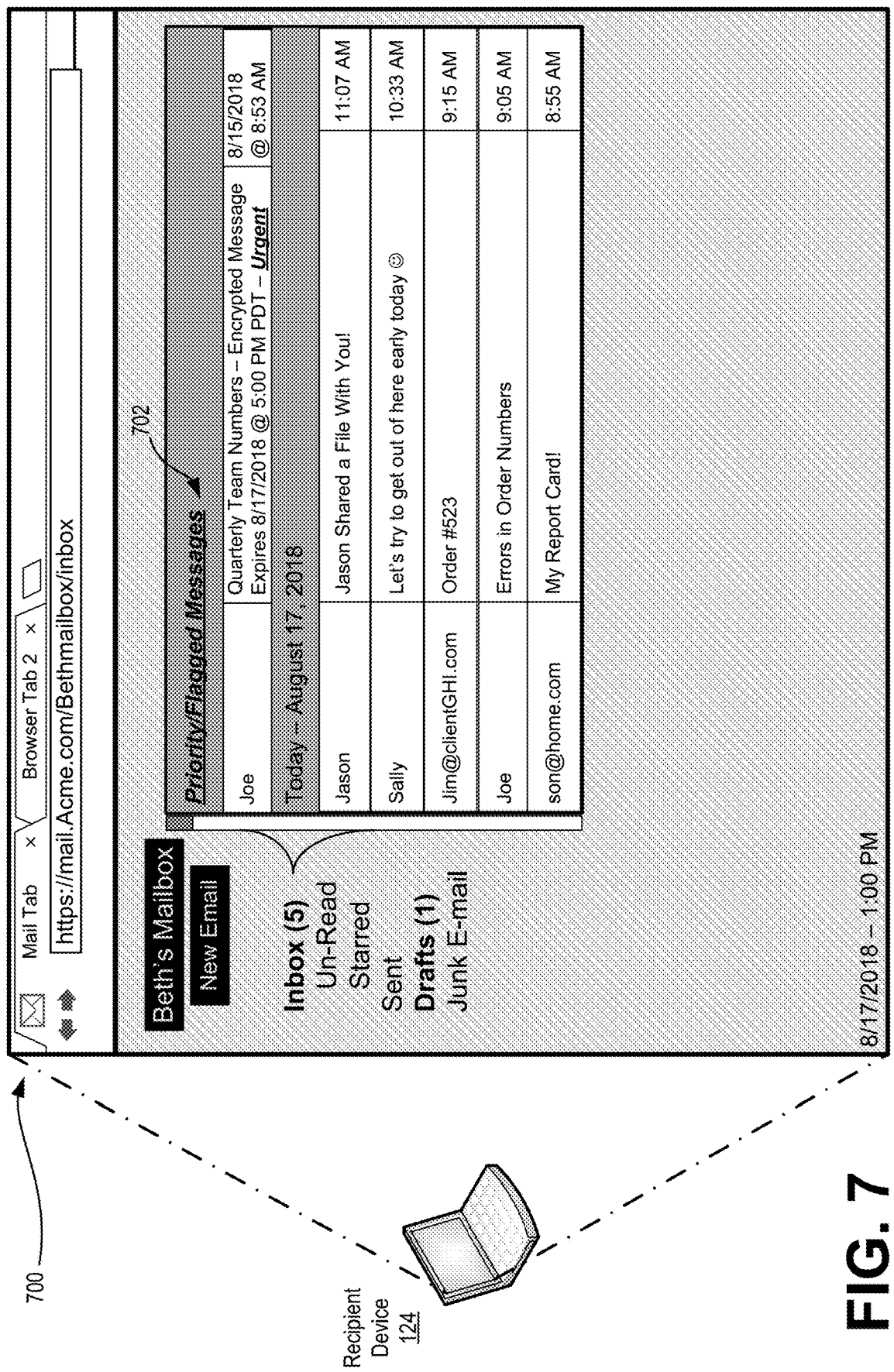
FIG. 7 illustrates yet another example GUI that can be displayed on the display of the recipient device prior to receiving a request, from a recipient user, to access the encrypted content included in the email message.

FIG. 7 illustrates yet another example GUI 700 that can be displayed on the display of the recipient device 124 prior to receiving a request, from a recipient user, to access the encrypted content included in the email message (e.g., example GUI 700 can be displayed prior to the example GUI 500 in FIG. 5). In this example, Beth's mailbox prioritizes the email message that includes the encrypted content by indexing the email message at a top of the inbox and/or by flagging the email message as an urgent email message 702. As shown, Beth's inbox is restructured to list Joe's email on the top even though it was sent by Joe on the morning of August 15 and the current date is August 17. Similar to the notifications of FIGS. 6A and 6B, the prioritization of the email message within the inbox can a predetermined amount of time prior to the expiration time (e.g., four hours as shown in FIG. 7).

Figure 8:
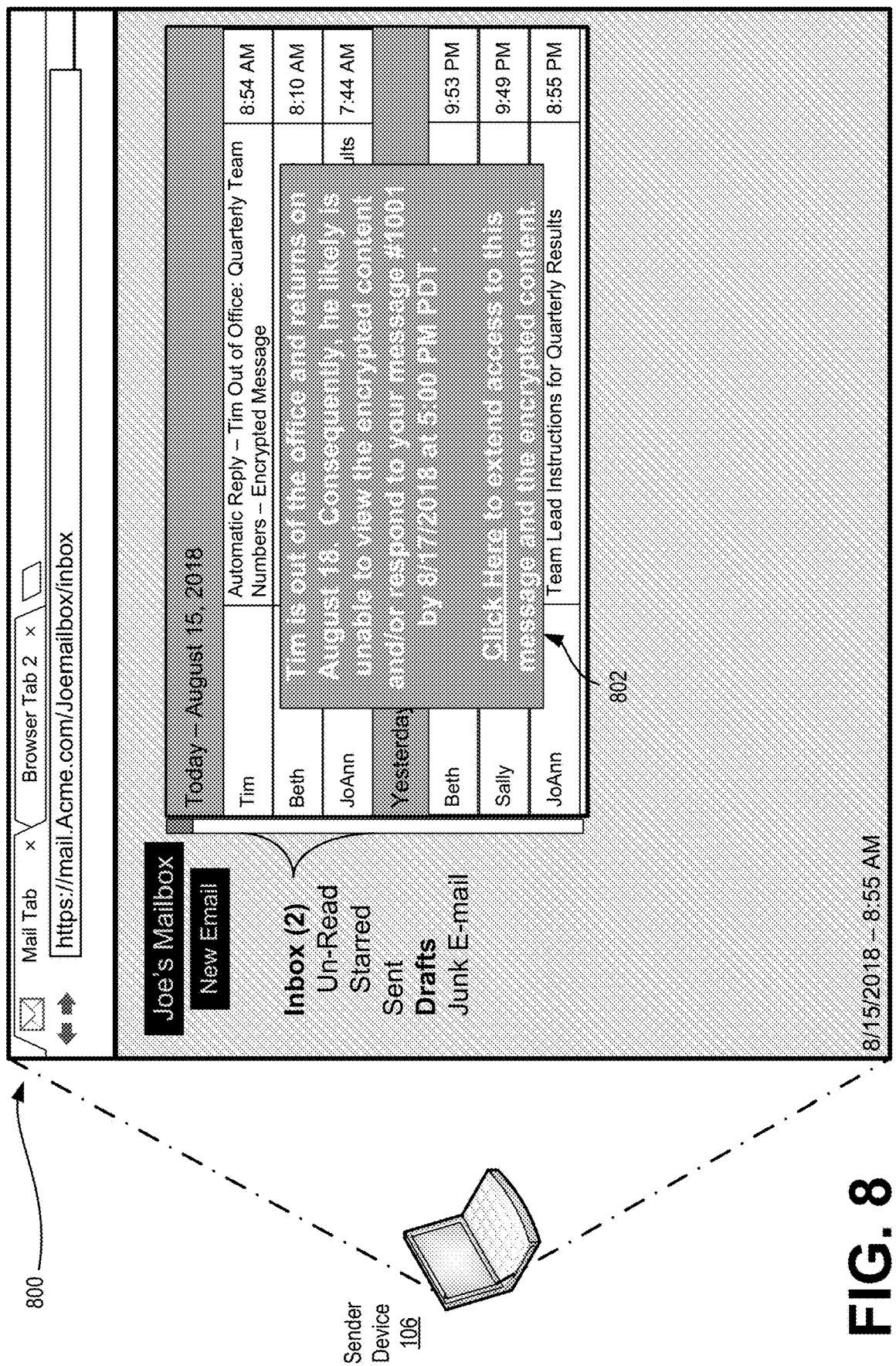
FIG. 8 illustrates an example GUI that can be displayed on the display of the sender device to inform the sender user that it has been determined that a recipient user is likely unable to access the encrypted content.

FIG. 8 illustrates an example GUI 800 that can be displayed on the display of the sender device 106 to inform the sender user 104 that it has been determined that a recipient user is likely unable to access the encrypted content. In various examples, the system can determine that a recipient user is likely unable to access the encrypted content based on reception of an auto-reply that indicates the recipient user is unavailable until a time after the time at which the decrypted access rights are configured to expire. As shown in Joe's inbox, an automatic reply is received from Tim at 8:54 AM right after the original email message is sent. The automatic reply may be an out-of-office reply that indicates a time period when Tim is unavailable and/or a date and time when Tim may return.

Based on the information included in the automatic reply, the system can generate a notification 802 to be displayed to Joe. The notification 802 informs Joe that Tim is out of the office and is set to return on August 18. Moreover, the notification 802 prompts Joe to extend the decrypted access period (e.g., change the current expiration time to a later expiration time) to accommodate Tim's unavailability. In this way, Joe can decide whether to extend the decrypted access period so Tim can view the encrypted content and/or so the addressees on the email message can see any reply Tim may send.

Figure 9:
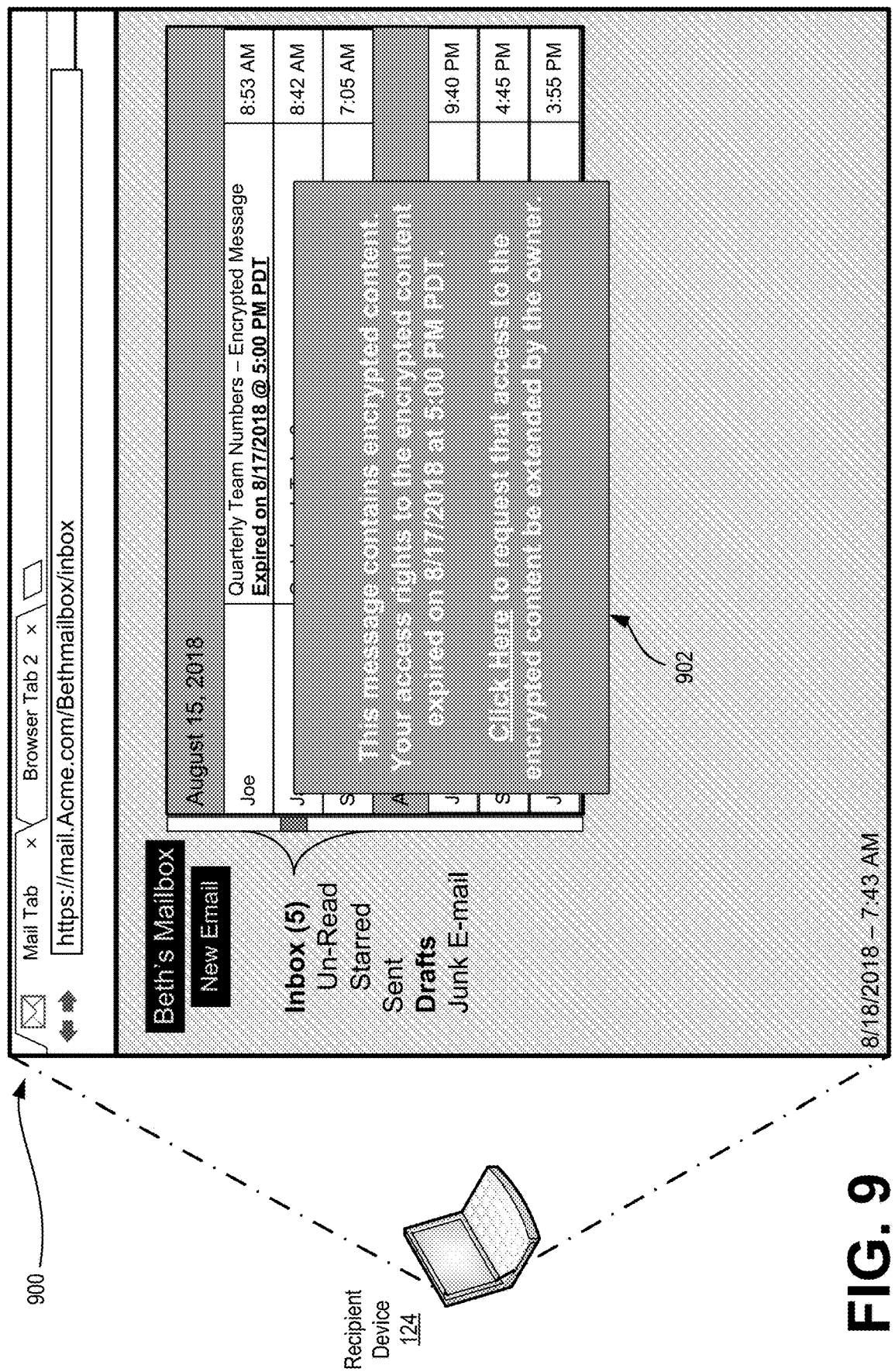
FIG. 9 illustrates an example GUI that can be displayed on the display of the recipient device when a recipient user requests access to encrypted content after the time at which his or her decrypted access rights have expired.

FIG. 9 illustrates an example GUI 900 that can be displayed on the display of the recipient device 124 when a recipient user 122 requests access to encrypted content after the time at which his or her decrypted access rights have expired. As shown, Beth is attempting to access the encrypted content of the email message at a time (e.g., Aug. 18, 2018 at 7:43 AM) after the time at which her allowed access expires (e.g., Aug. 17, 2018 at 5:00 PM). In resposne, the system can display a notification 902 informing Beth that her access rights have expired, and thus, the encrypted content will not be decrypted and displayed in response to her access request. Further, the system provides an opportunity for Beth to request that the owner of the encrypted content extend access (e.g., by clicking on a link configured to generate and send a request for extended access to Joe). In some examples, an experience can navigate Beth to an encryption portal where she can request that Joe extend the access to the encrypted content.

Figure 10:
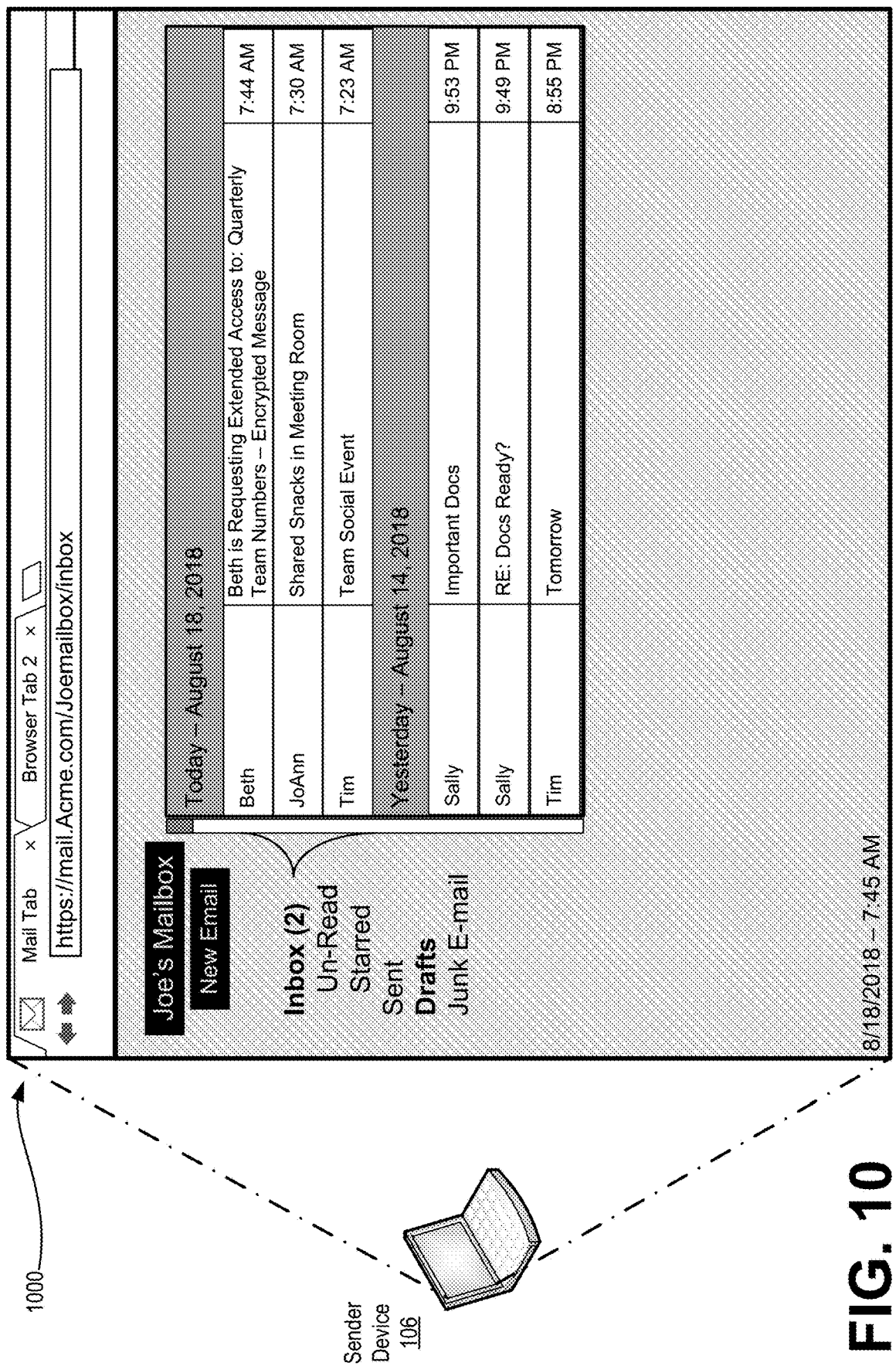
FIG. 10 illustrates an example GUI that can be displayed on the display of the sender device to inform the sender user that a recipient user has requested extended access to the encrypted content.

Continuing the example of FIG. 9, FIG. 10 illustrates an example GUI 1000 that can be displayed on the display of the sender device 106 to inform the sender user 104 that a recipient user has requested extended access to the encrypted content. As shown, Joe's mailbox has received, after the time period for decrypted access has expired, an indication (e.g., an email message) that Beth would like an extended time period to access the encrypted content. In some examples, Joe's mailbox can generate, based on reception of the indication, a notification prompting Joe to extend the decrypted access period (e.g., change the current expiration time to a later expiration time) to accommodate Beth's delay in requesting decrypted access to the encrypted content.

Each of FIGS. 11-13 and 15 is a flow diagram of an illustrative process. The processes may be implemented in association with the discussion of one or more of FIGS. 1-10 and 14. An individual process is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement a claimed process.

Figure 11:
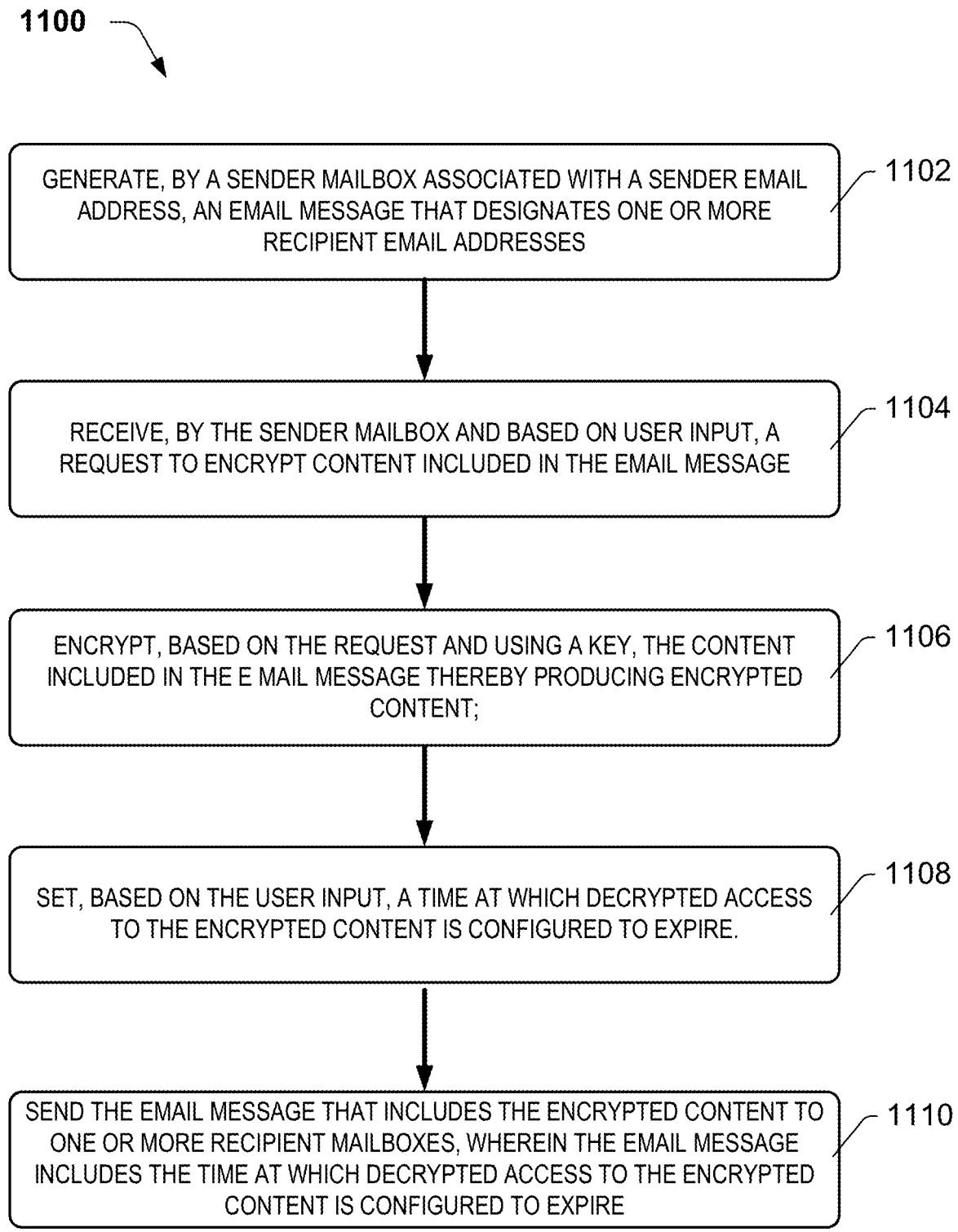
FIG. 11 illustrates an example process directed to generating and sending an email message that includes encrypted content, decrypted access to which is set to expire at a specific time (e.g., a date and time).

FIG. 11 illustrates an example process 1100 directed to generating and sending an email message that includes encrypted content, decrypted access to which is set to expire at a specific time (e.g., a date and time). The operations illustrated in the example process 1100 may be implemented by the system illustrated in FIG. 1.

At operation 1102, a sender mailbox associated with a sender email address generates, based on user input, an email message that designates one or more recipient email addresses.

At operation 1104, the sender mailbox, receives, based on further user input, a request to encrypt content included in the email message. As described above, the email message may include confidential and/or sensitive information that the sender user wants protected and secured.

At operation 1106, the content in the email message is encrypted using a key, thereby producing encrypted content.

At operation 1108, a time at which decrypted access to the encrypted content is configured to expire is set. The time can be set based on additional input from the sender user.

At operation 1110, the email message that includes the encrypted content is sent from the sender mailbox to one or more recipient mailboxes respectively associated with the one or more recipient email addresses. The email message includes the time at which decrypted access to the encrypted content is configured to expire.

Figure 12:
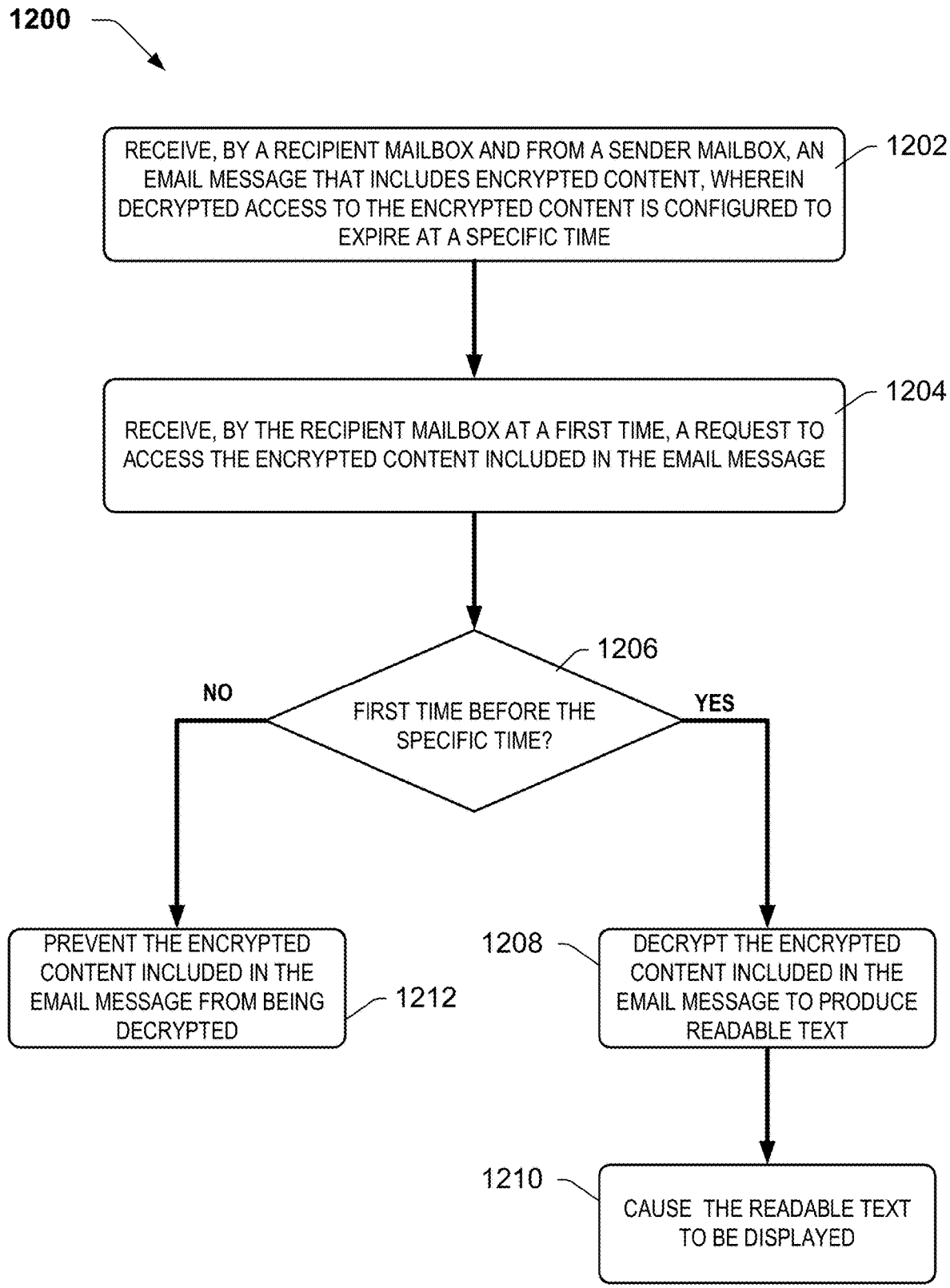
FIG. 12 illustrates an example process directed to receiving an email message that includes encrypted content and determining whether decrypted access to the encrypted content is requested before the specific time at which the decrypted access is set to expire.

FIG. 12 illustrates an example process 1200 directed to receiving an email message that includes encrypted content and determining whether decrypted access to the encrypted content is requested before the specific time at which the decrypted access is set to expire. The operations illustrated in the example process 1200 may be implemented by the system illustrated in FIG. 1, in response to the operations in the example process 1100 of FIG. 11.

At operation 1202, a recipient mailbox receives, from a sender mailbox, an email message that includes encrypted content. As described above, decrypted access to the encrypted content is configured to expire at a specific time, as set by an owner of the encrypted content.

At operation 1204, the recipient mailbox receives, at a first time, a request to access the encrypted content included in the email message.

At operation 1206, it is determined whether the first time at which the request to access the encrypted content is received is before the specific time at which decrypted access to the encrypted content is configured to expire.

If it is determined that the first time at which the request to access the encrypted content is received before the specific time at which decrypted access to the encrypted content is configured to expire (e.g., "yes" at operation 1206), at operation 1208, the encrypted content included in the email message is decrypted to produce comprehendible content such as readable text. Moreover, at operation 1210, the readable text is caused to be displayed on a device at which the recipient mailbox is being accessed by a recipient user. Causing the display of the readable text may include the transmission of data, the rendering of the data, and/or the display of the data.

If it is determined that the first time at which the request to access the encrypted content is received after the specific time at which decrypted access to the encrypted content is configured to expire (e.g., "no" at operation 1206), at operation 1212, the encrypted content is prevented from being decrypted and/or displayed in a readable format.

Figure 13:
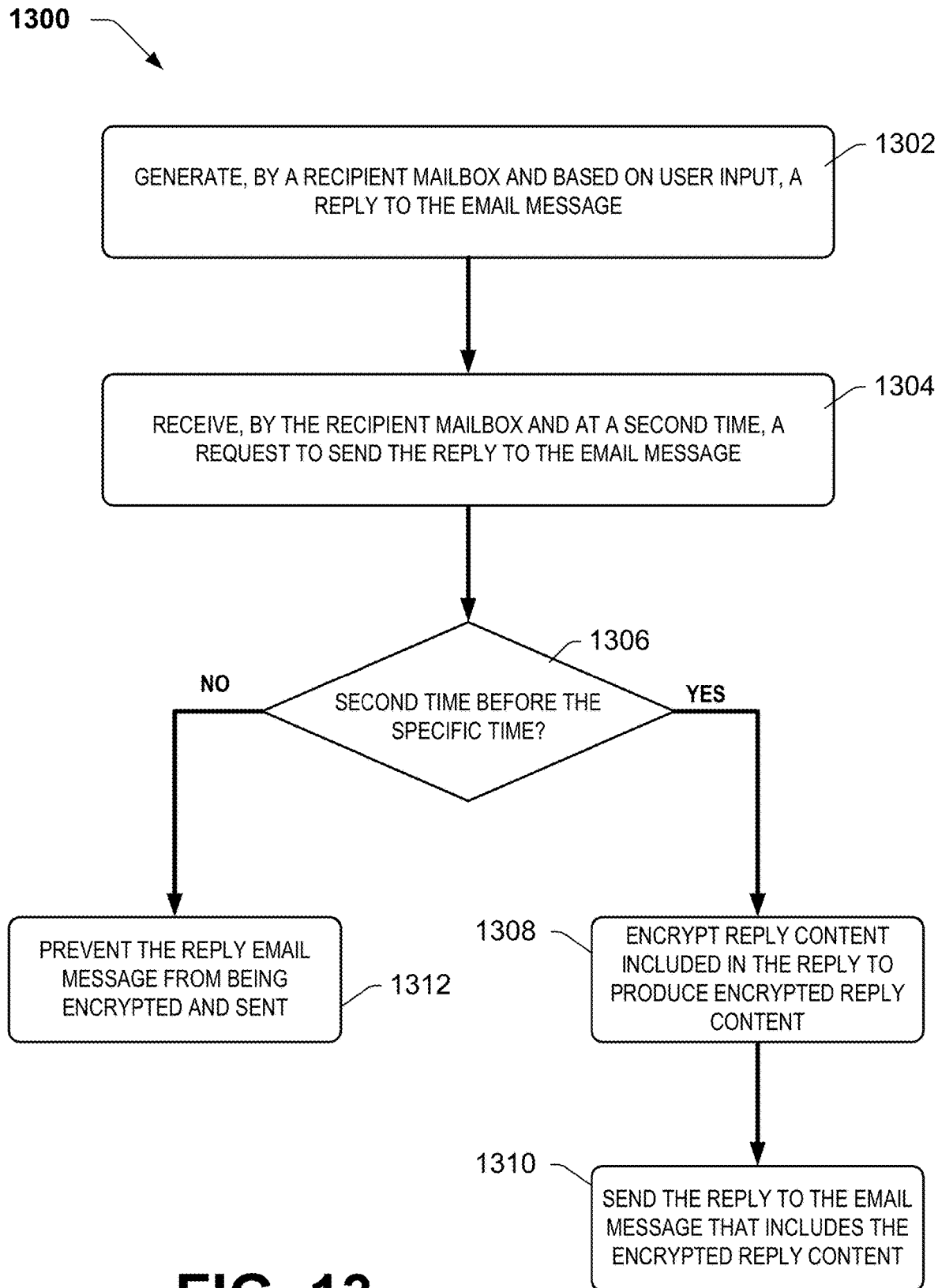
FIG. 13 illustrates an example process directed to generating and sending a reply email message that includes encrypted reply content, decrypted access to which is set to expire at the specific time.

FIG. 13 illustrates an example process 1300 directed to generating and sending a reply email message that includes encrypted reply content, decrypted access to which is set to expire at the specific time. The operations illustrated in the example process 1300 may be implemented by the system illustrated in FIG. 2.

At operation 1302, a recipient mailbox that receives the email message with encrypted content generates, based on user input, a reply to the email message At operation 1304, the recipient mailbox receives, at a second time, a request to send the reply to the email message.

At operation 1306, it is determined whether the second time is before the specific time.

If it is determined that the second time at which the request to send the reply to the email message is received before the specific time at which decrypted access to the originally encrypted content is configured to expire (e.g., "yes" at operation 1306), at operation 1308, reply content included in the reply email message is encrypted. Moreover, at operation 1310, the reply email message that includes the encrypted reply content is sent to the sender user that sent the original email message and/or one or more other recipient users.

If it is determined that the second time at which the request to send the reply to the email message is received after the specific time at which decrypted access to the originally encrypted content is configured to expire (e.g., "no" at operation 1306), at operation 1312, the reply email message is prevented from being encrypted and sent.

Figure 14:
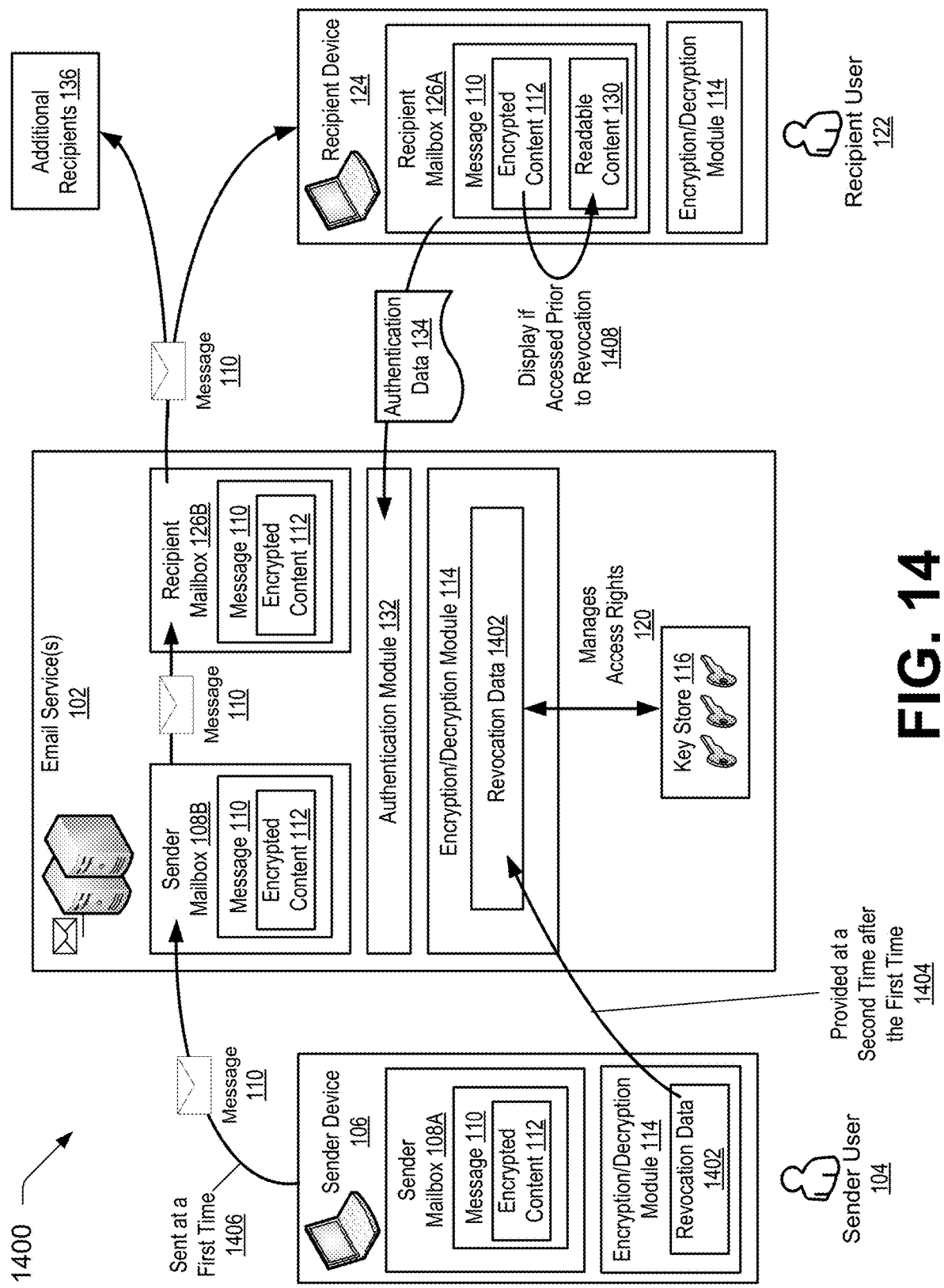
FIG. 14 illustrates an example environment in which a system is configured to manage and/or control decrypted access to encrypted content included in an email message based on revocation data.

FIG. 14 illustrates an example environment 1400 in which a system is configured to manage and/or control decrypted access to encrypted content included in an email message based on revocation data. It can be appreciated that numerous aspects of the example environment 1400 are the same or similar to the example environment 100 illustrated with respect FIG. 1. However, in the example environment 1400, revocation data 1402 is used to revoke decrypted access rights to the encrypted content for recipients rather than expiration data 118.

The revocation data 1402 is provided to the email service 102 at a second time 1404 after a first time 1406 at which the email message with the encrypted content is initially sent. Accordingly, the sender user 104 can reactively provide input to establish the revocation data 1402 in order to immediately and instantaneously pull decrypted access rights at any time and for any one of various reasons. Consequently, a recipient of the email message 110 loses decrypted access to the encrypted content included therein, even though the email message itself may not and/or cannot be removed from the mailbox of the recipient by the sender user. For example, if the recipient 122 requests access to the encrypted content 112 prior to his or her rights being revoked, then the recipient mailbox 126 is configured to display the encrypted content in a readable format 1408 that can be understood (e.g., readable content 130).

Figure 15:
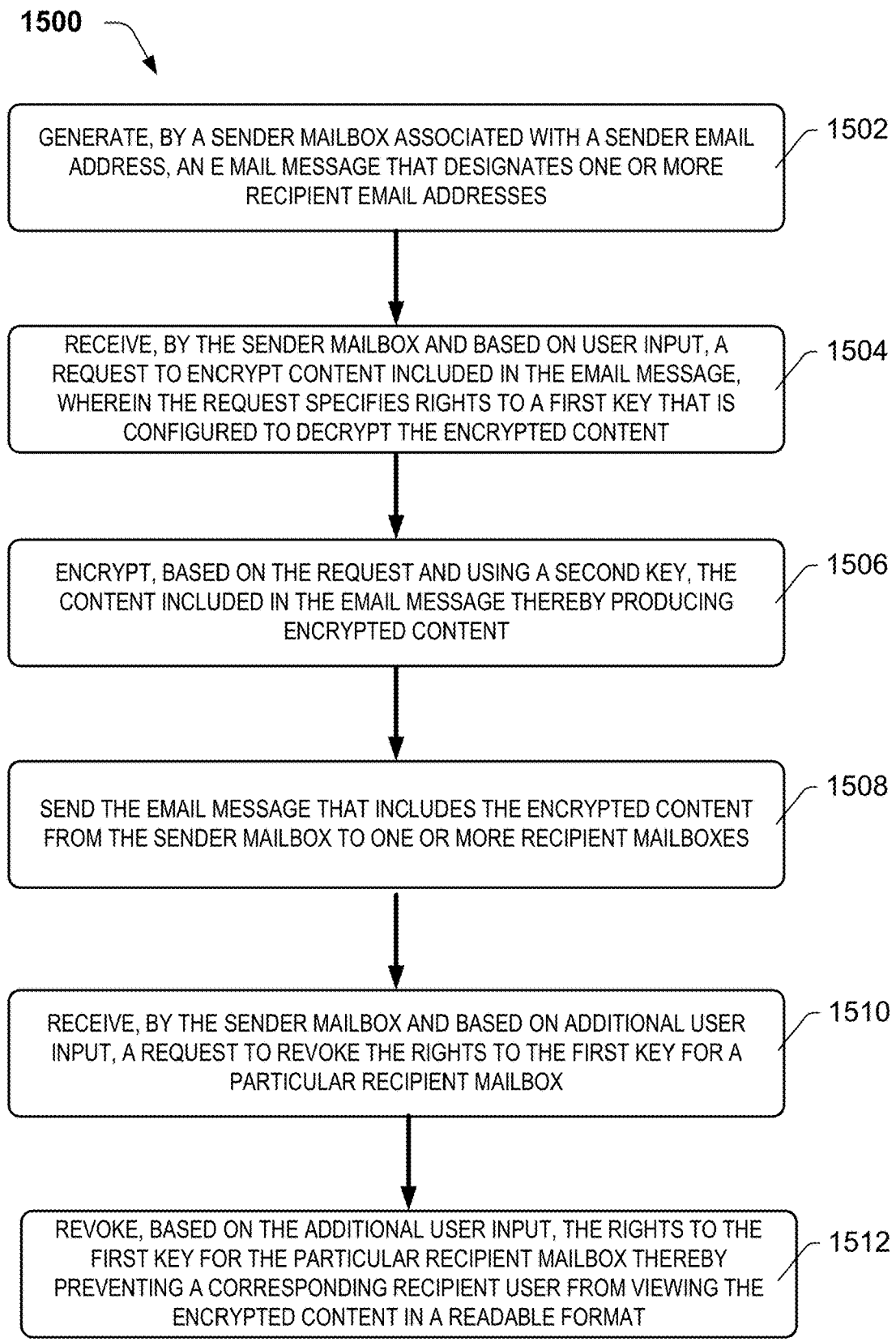
FIG. 15 illustrates an example process directed to generating and sending an email message that includes encrypted content, decrypted access to which is revoked at a specific time based on user input.

FIG. 15 illustrates an example process 1500 directed to generating and sending an email message that includes encrypted content, decrypted access to which is revoked at a specific time based on user input. The operations illustrated in the example process 1500 may be implemented by the system illustrated in FIG. 14.

At operation 1502, a sender mailbox generates an email message that designates one or more recipient email addresses.

At operation 1504, the sender mailbox receives, based on user input, a request to encrypt content included in the email message. The request specifies rights to a first key that is configured to decrypt the encrypted content included in the email message for one or more recipient mailboxes respectively associated with the one or more recipient email addresses.

At operation 1506, the content included in the email message is encrypted, using a second key, thereby producing the encrypted content.

At operation 1508, the email message that includes the encrypted content is sent from the sender mailbox to one or more recipient mailboxes.

At operation 1510, the sender mailbox receives, at a time after the email message was sent and based on additional user input, a request to revoke the rights to the first key for a particular recipient mailbox of the one or more recipient mailboxes.

At operation 1512, the rights to the first key are revoked for the particular recipient mailbox thereby preventing a corresponding recipient user from viewing the encrypted content in a readable format.

Figure 16:
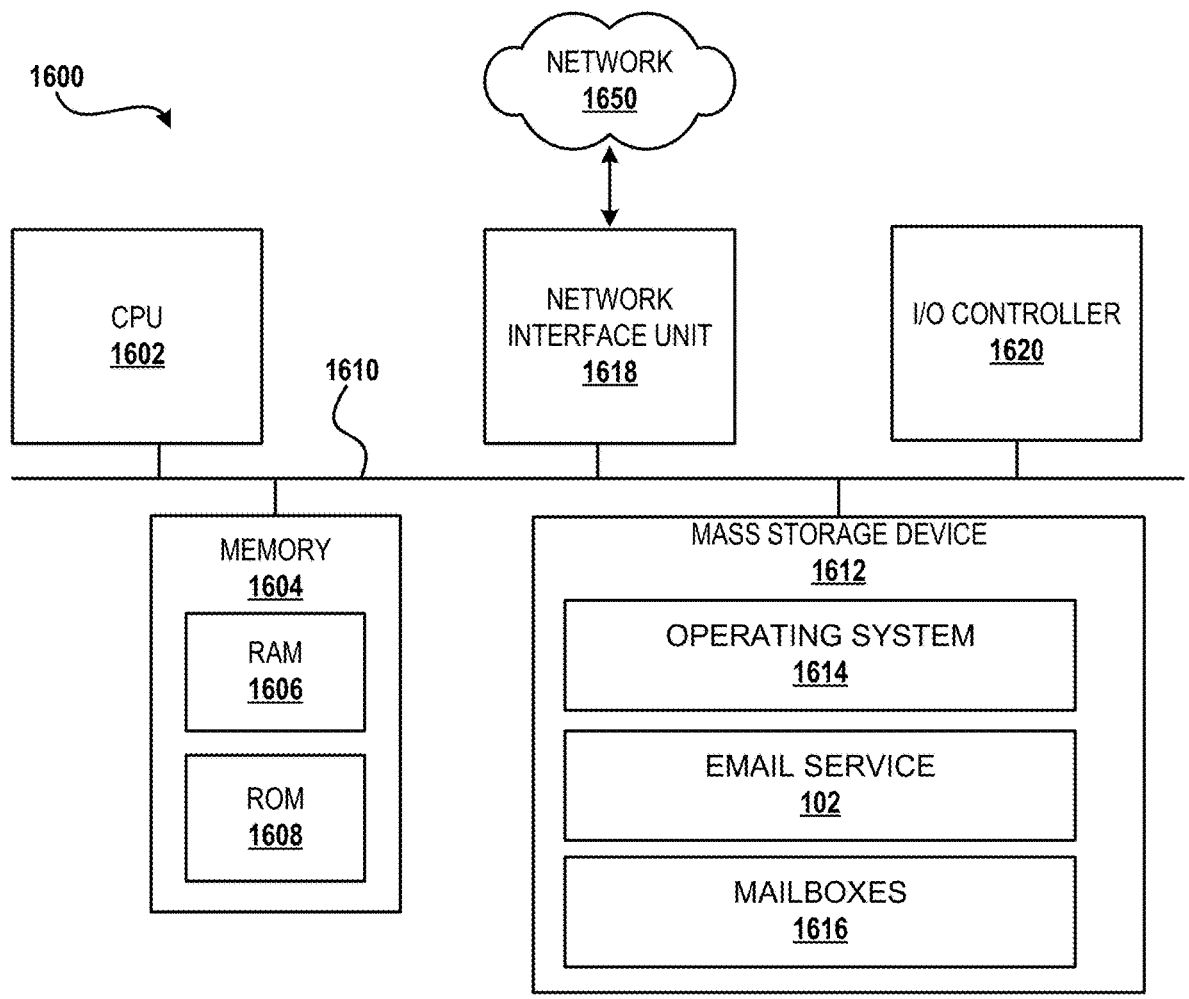
FIG. 16 illustrates additional details of an example computer architecture for a system and/or a device capable of executing the techniques described herein.

FIG. 16 illustrates additional details of an example computer architecture 1600 for a system and/or a device capable of executing the techniques described herein. Thus, the computer architecture 1600 illustrated in FIG. 16 illustrates an architecture for a server computer, or network of server computers, a desktop computer, a laptop computer, a tablet computer, a mobile computer such as a smart phone, or any other types of computing devices suitable for implementing the functionality described herein. The computer architecture 1600 may be utilized to execute any aspects of the software components presented herein.

The computer architecture 1600 includes a central processing unit 1602 ("CPU"), a system memory 1604, including a random-access memory 1606 ("RAM") and a read-only memory ("ROM") 1608, and a system bus 1610 that couples the memory 1604 to the CPU 1602. A basic input/output system containing the basic routines that help to transfer information between elements within the computer architecture 1600, such as during startup, is stored in the ROM 1608. The computer architecture 1600 further includes a mass storage device 1612 for storing an operating system 1614, other data, and one or more application programs. The mass storage device 1612 may further include one or more of an email service 102 and/or a mailboxes 1616 (e.g., sender mailbox, recipient mailbox, etc.).

The mass storage device 1612 may be connected to the CPU 1602 through a mass storage controller connected to the bus 1610. The mass storage device 1612 and its associated computer-readable media provide non-volatile storage for the computer architecture 1600. Although the description of computer-readable media contained herein refers to a mass storage device, such as a solid-state drive, a hard disk or CD-ROM drive, it should be appreciated by those skilled in the art that computer-readable media can be any available non-transitory computer storage media or communication media that can be accessed by the computer architecture 1600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1600. For purposes the claims, the phrase "computer storage medium," "computer-readable storage medium" and variations thereof, does not include waves, signals, and/or other transitory and/or intangible communication media, per se.

According to various configurations, the computer architecture 1600 may operate in a networked environment using logical connections to remote computers through a network (s) 1650. The computer architecture 1600 may connect to the network 1650 through a network interface unit 1618 connected to the bus 1610. It should be appreciated that the network interface unit 1618 also may be utilized to connect to remote computer systems. The computer architecture 1600 also may include an input/output controller 1620 for receiving and processing input from a number of other devices, including a keyboard, mouse, or electronic stylus. Similarly, the input/output controller 1620 may provide output to a display screen, a printer, or other type of output device.

In various examples, via a connection to the network 1650 through a network interface unit 1618, the computing architecture may enable the email service 102 to communicate with one or more of another email service 102, the sender device 104, and/or the recipient device 124.

It should be appreciated that the software components described herein may, when loaded into the CPU 1602 and executed, transform the CPU 1602 and the overall computer architecture 1600 from a general-purpose computing system into a special-purpose computing system customized to facilitate the functionality presented herein. The CPU 1602 may be constructed from any number of transistors or other discrete circuit elements, which may individually or collectively assume any number of states. More specifically, the CPU 1602 may operate as a finite-state machine, in response to executable instructions contained within the software modules disclosed herein. These computer-executable instructions may transform the CPU 1602 by specifying how the CPU 1602 transitions between states, thereby transforming the transistors or other discrete hardware elements constituting the CPU 1602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1600 in order to store and execute the software components presented herein. It also should be appreciated that the computer architecture 1600 may include other types of computing devices, including hand-held computers, embedded computer systems, personal digital assistants, and other types of computing devices known to those skilled in the art. It is also contemplated that the computer architecture 1600 may not include all of the components shown in FIG. 16, may include other components that are not explicitly shown in FIG. 16, or may utilize an architecture completely different than that shown in FIG. 16.

The disclosure presented herein may be considered in view of the following clauses.

Example Clause A, a system comprising: one or more processors; and a memory in communication with the one or more processors, the memory having computer-readable instructions stored thereupon which, when executed by the one or more processors, direct the system to: receive, by a recipient mailbox associated with a recipient email address and from a sender mailbox associated with a sender email address, an electronic mail message that includes encrypted content, wherein decrypted access to the encrypted content is configured to expire at a specific time; receive, by the recipient mailbox at a first time, a request to access the encrypted content included in the electronic mail message; determine that the first time is before the specific time at which decrypted access to the encrypted content is configured to expire; decrypt, based on the determining that the first time is before the specific time at which decrypted access to the encrypted content is configured to expire, the encrypted content included in the electronic mail message to produce readable text; cause the readable text to be displayed on a device at which the recipient mailbox is being accessed by a recipient user; generate, by the recipient mailbox and based on user input, a reply to the electronic mail message; receive, by the recipient mailbox and at a second time, a request to send the reply to the electronic mail message; determine, based on the request to send the reply to the electronic mail message, that the second time is before the specific time; encrypt, based on the determining that the second time is before the specific time, reply content included in the reply to the electronic mail message to produce encrypted reply content; and send the reply to the electronic mail message that includes the encrypted reply content from the recipient mailbox to the sender mailbox.

Example Clause B, the system of Example Clause A, wherein, prior to receiving the request to access the encrypted content included in the electronic mail message, the computer-readable instructions further direct the system to cause a notification to be displayed in association with the recipient mailbox, the notification reminding the recipient user that decrypted access to the encrypted content is configured to expire at the specific time.

Example Clause C, the system of Example Clause B, wherein the notification is configured to be displayed a predetermined amount of time prior to the specific time.

Example Clause D, the system of any one of Example Clauses A through C, wherein, prior to receiving the request to access the encrypted content included in the electronic mail message, the computer-readable instructions further direct the system to cause the recipient mailbox to prioritize the electronic mail message that includes the encrypted content by indexing the electronic mail message at a top of the recipient mailbox or by flagging the electronic mail message.

Example Clause E, the system of Example Clause D, wherein the prioritizing of the electronic mail message occurs a predetermined amount of time prior to the specific time.

Example Clause F, the system of any one of Example Clauses A through E, wherein the computer-readable instructions further direct the system to send the reply to the electronic mail message that includes the encrypted reply content from the recipient mailbox to other recipient mailboxes originally addressed on the electronic mail message.

Example Clause G, the system of any one of Example Clauses A through F, wherein the computer-readable instructions further direct the system to cause the specific time to be displayed in association with the electronic mail message in the recipient mailbox.

Example Clause H, the system of any one of Example Clauses A through G, wherein the decrypting is performed using a symmetry key.

Example Clause I, the system of Example Clause H, wherein the decrypting is enabled based on reception of a token that authenticates the recipient email address or based on reception of a passcode that authenticates the recipient email address.

While Example Clauses A through I are described above with respect to a system, it is understood in the context of this disclosure that the subject matter of Example Clauses A through I can additionally or alternatively be implemented as a method or via computer-readable storage media.

Example Clause J, a system comprising: one or more processors; and a memory in communication with the one or more processors, the memory having computer-readable instructions stored thereupon which, when executed by the one or more processors, direct the system to: generate, by a sender mailbox associated with a sender email address, an electronic mail message that designates one or more recipient email addresses; receive, by the sender mailbox and based on user input, a request to encrypt content included in the electronic mail message; encrypt, based on the request and using a key, the content included in the electronic mail message thereby producing encrypted content; set, based on the user input, a time at which decrypted access to the encrypted content is configured to expire; and send the electronic mail message that includes the encrypted content from the sender mailbox to one or more recipient mailboxes respectively associated with the one or more recipient email addresses, wherein the electronic mail message includes the time at which decrypted access to the encrypted content is configured to expire.

Example Clause K, the system of Example Clause J, wherein the computer-readable instructions further direct the system to: receive, from a recipient mailbox of the one or more recipient mailboxes, a request to access the encrypted content included in the electronic mail message; determine that a time at which the request is received is before the time at which decrypted access to the encrypted content is configured to expire; decrypt, based on the determining that the time at which the request is received is before the time at which decrypted access to the encrypted content is configured to expire and using another key that corresponds to the key, the encrypted content included in the electronic mail message to produce readable text; and cause the readable text to be displayed on a device at which the recipient mailbox is being accessed by a recipient user.

Example Clause L, the system of Example Clause J, wherein the computer-readable instructions further direct the system to: receive, by the sender mailbox and from a recipient mailbox of the one or more recipient mailboxes, an auto-reply that indicates a recipient user associated with the recipient mailbox is unavailable until a time after the time at which decrypted access to the encrypted content is configured to expire; generate, by the sender mailbox, a notification for display to a sender user, the notification prompting the sender user to change the time at which decrypted access to the encrypted content is configured to expire to a later time; and change, based on further user input from the sender user, the time at which decrypted access to the encrypted content is configured to expire to the later time.

Example Clause M, the system of Example Clause L, wherein the later time is used to manage the decrypted access to the encrypted content for each of the one or more recipient mailboxes.

Example Clause N, the system of Example Clause L, wherein the later time is used to manage the decrypted access to the encrypted content for the recipient mailbox and not for other recipient mailboxes of the one or more recipient mailboxes.

Example Clause O, the system of Example Clause J, wherein the computer-readable instructions further direct the system to: receive, by the sender mailbox after the time at which decrypted access to the encrypted content is configured to expire, an indication that a recipient would like to access the encrypted content; and generate, by the sender mailbox, a notification for display to a sending user, the notification prompting the sending user to change the time at which decrypted access to the encrypted content is configured to expire to a later time.

Example Clause P, the system of Example Clause J, wherein the time at which decrypted access to the encrypted content is configured to expire is set for a particular recipient mailbox of the one or more recipient mailboxes.

Example Clause Q, the system of any one of Example Clauses J through P, wherein the electronic mail message includes the encrypted content as an attachment.

While Example Clauses J through Q are described above with respect to a system, it is understood in the context of this disclosure that the subject matter of Example Clauses J through Q can additionally or alternatively be implemented as a method or via computer-readable storage media.

Example Clause R, a system comprising: one or more processors; and a memory in communication with the one or more processors, the memory having computer-readable instructions stored thereupon which, when executed by the one or more processors, direct the system to: generate, by a sender mailbox associated with a sender email address, an electronic mail message that designates one or more recipient email addresses; receive, by the sender mailbox and based on user input, a request to encrypt content included in the electronic mail message, wherein the request specifies rights to a first key that is configured to decrypt the encrypted content included in the electronic mail message for one or more recipient mailboxes respectively associated with the one or more recipient email addresses; encrypt, based on the request and using a second key, the content included in the electronic mail message thereby producing the encrypted content; send the electronic mail message that includes the encrypted content from the sender mailbox to the one or more recipient mailboxes; receive, by the sender mailbox and based on additional user input, a request to revoke the rights to the first key for a particular recipient mailbox of the one or more recipient mailboxes; and revoke, based on the additional user input, the rights to the first key for the particular recipient mailbox thereby preventing a corresponding recipient user from viewing the encrypted content in a readable format.

Example Clause S, the system of Example Clause R, wherein the first key and the second key are each a symmetry key.

Example Clause T, the system of Example Clause R or Example Clause S, wherein the computer-readable instructions further direct the system to generate a notification for the corresponding recipient user, the notification indicating that the rights to the first key have been revoked.

While Example Clauses R through T are described above with respect to a system, it is understood in the context of this disclosure that the subject matter of Example Clauses R through T can additionally or alternatively be implemented as a method or via computer-readable storage media.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

It can be appreciated any reference to "first," "second," etc. items within the description is not intended to and should not be construed to necessarily correspond to any reference of "first," "second," etc. elements of the claims.

What is claimed is:
1. A system comprising:
one or more processors; and
a memory in communication with the one or more processors, the memory having computer-readable instructions stored thereupon which, when executed by the one or more processors, direct the system to:
    receive, by a recipient mailbox associated with a recipient email address and from a sender mailbox associated with a sender email address, an electronic mail message that includes encrypted content, wherein decrypted access to the encrypted content is configured to expire at a specific time;
    cause the recipient mailbox to prioritize the electronic mail message that includes the encrypted content by indexing the electronic mail message at a top of the recipient mailbox, wherein the prioritizing of the electronic mail message occurs a predetermined amount of time prior to the specific time;
    receive, by the recipient mailbox at a first time, a request to access the encrypted content included in the electronic mail message;
    determine that the first time is before the specific time at which decrypted access to the encrypted content is configured to expire;
    decrypt, based on the determining that the first time is before the specific time at which decrypted access to the encrypted content is configured to expire, the encrypted content included in the electronic mail message to produce readable text; and
    cause the readable text to be displayed on a device at which the recipient mailbox is being accessed by a recipient user.

2. The system of claim 1, wherein, prior to receiving the request to access the encrypted content included in the electronic mail message, the computer-readable instructions further direct the system to cause a notification to be displayed in association with the recipient mailbox, the notification reminding the recipient user that decrypted access to the encrypted content is configured to expire at the specific time.

3. The system of claim 2, wherein the notification is configured to be displayed a predetermined amount of time prior to the specific time.

4. The system of claim 1, wherein the computer-readable instructions further direct the system to:
    generate, by the recipient mailbox and based on user input, a reply to the electronic mail message;
    receive, by the recipient mailbox and at a second time, a request to send the reply to the electronic mail message;
    determine, based on the request to send the reply to the electronic mail message, that the second time is before the specific time;
    encrypt, based on the determining that the second time is before the specific time, reply content included in the reply to the electronic mail message to produce encrypted reply content;

send the reply to the electronic mail message that includes the encrypted reply content from the recipient mailbox to the sender mailbox; and send the reply to the electronic mail message that includes the encrypted reply content from the recipient mailbox to other recipient mailboxes originally addressed on the electronic mail message.

5. The system of claim 1, wherein the computer-readable instructions further direct the system to cause the specific time to be displayed in association with the electronic mail message in the recipient mailbox.

6. The system of claim 1, wherein the decrypting is performed using a symmetry key.

7. The system of claim 6, wherein the decrypting is enabled based on reception of a token that authenticates the recipient email address or based on reception of a passcode that authenticates the recipient email address.

8. A system comprising:
one or more processors; and
a memory in communication with the one or more processors, the memory having computer-readable instructions stored thereupon which, when executed by the one or more processors, direct the system to:
generate, by a sender mailbox associated with a sender email address, an electronic mail message that designates one or more recipient email addresses;
receive, by the sender mailbox and based on user input from a sender user, a request to encrypt content included in the electronic mail message;
encrypt, based on the request and using a key, the content included in the electronic mail message thereby producing encrypted content;
set, based on the user input, a time at which decrypted access to the encrypted content is configured to expire;
send the electronic mail message that includes the encrypted content from the sender mailbox to one or more recipient mailboxes respectively associated with the one or more recipient email addresses, wherein the electronic mail message includes the time at which decrypted access to the encrypted content is configured to expire;
receive, by the sender mailbox and from a recipient mailbox of the one or more recipient mailboxes, an auto-reply that indicates a recipient user associated with the recipient mailbox is unavailable until a time after the time at which decrypted access to the encrypted content is configured to expire;
generate, by the sender mailbox, a notification for display to the sender user, the notification prompting the sender user to change the time at which decrypted access to the encrypted content is configured to expire to a later time; and
change, based on further user input from the sender user, the time at which decrypted access to the encrypted content is configured to expire to the later time.

9. The system of claim 8, wherein the computer-readable instructions further direct the system to:
receive, from the recipient mailbox of the one or more recipient mailboxes, a request to access the encrypted content included in the electronic mail message;
determine that a time at which the request is received is before the later time at which decrypted access to the encrypted content is configured to expire;
decrypt, based on the determining that the time at which the request is received is before the later time at which decrypted access to the encrypted content is configured to expire and using another key that corresponds to the key, the encrypted content included in the electronic mail message to produce readable text; and
cause the readable text to be displayed on a device at which the recipient mailbox is being accessed by a recipient user.

10. The system of claim 8, wherein the later time is used to manage the decrypted access to the encrypted content for each of the one or more recipient mailboxes.

11. The system of claim 8, wherein the later time is used to manage the decrypted access to the encrypted content for the recipient mailbox and not for other recipient mailboxes of the one or more recipient mailboxes.

12. The system of claim 8, wherein the computer-readable instructions further direct the system to:
receive, by the sender mailbox after the later time at which decrypted access to the encrypted content is configured to expire, an indication that another recipient user would like to access the encrypted content; and
generate, by the sender mailbox, another notification for display to the sender user, the notification prompting the sender user to change the later time at which decrypted access to the encrypted content is configured to expire to another later time.

13. The system of claim 8, wherein the time at which decrypted access to the encrypted content is configured to expire is set for a particular recipient mailbox of the one or more recipient mailboxes.

14. The system of claim 8, wherein the electronic mail message includes the encrypted content as an attachment.

15. A method comprising:
generating, by a sender mailbox associated with a sender email address, an electronic mail message that designates one or more recipient email addresses;
receiving, by the sender mailbox and based on user input from a sender user, a request to encrypt content included in the electronic mail message;
encrypting, based on the request and using a key, the content included in the electronic mail message thereby producing encrypted content;
setting, based on the user input, a time at which decrypted access to the encrypted content is configured to expire;
sending the electronic mail message that includes the encrypted content from the sender mailbox to one or more recipient mailboxes respectively associated with the one or more recipient email addresses, wherein the electronic mail message includes the time at which decrypted access to the encrypted content is configured to expire;
receiving, by the sender mailbox and from a recipient mailbox of the one or more recipient mailboxes, an auto-reply that indicates a recipient user associated with the recipient mailbox is unavailable until a time after the time at which decrypted access to the encrypted content is configured to expire;
generating, by the sender mailbox, a notification for display to the sender user, the notification prompting the sender user to change the time at which decrypted access to the encrypted content is configured to expire to a later time; and
changing, by one or more processors and based on further user input from the sender user, the time at which decrypted access to the encrypted content is configured to expire to the later time.

16. The method of claim 15, further comprising:
receiving, from the recipient mailbox of the one or more recipient mailboxes, a request to access the encrypted content included in the electronic mail message;
determining that a time at which the request is received is before the later time at which decrypted access to the encrypted content is configured to expire;
decrypting, based on the determining that the time at which the request is received is before the later time at which decrypted access to the encrypted content is configured to expire and using another key that corresponds to the key, the encrypted content included in the electronic mail message to produce readable text; and
causing the readable text to be displayed on a device at which the recipient mailbox is being accessed by a recipient user.

17. The method of claim 15, wherein the later time is used to manage the decrypted access to the encrypted content for each of the one or more recipient mailboxes.

18. The method of claim 15, wherein the later time is used to manage the decrypted access to the encrypted content for the recipient mailbox and not for other recipient mailboxes of the one or more recipient mailboxes.

19. The method of claim 15, further comprising:
receiving, by the sender mailbox after the later time at which decrypted access to the encrypted content is configured to expire, an indication that another recipient user would like to access the encrypted content; and
generating, by the sender mailbox, another notification for display to the sender user, the notification prompting the sender user to change the later time at which decrypted access to the encrypted content is configured to expire to another later time.

20. The method of claim 15, wherein the time at which decrypted access to the encrypted content is configured to expire is set for a particular recipient mailbox of the one or more recipient mailboxes.

* * * * *